US007624426B1

(12) United States Patent
Okada

(10) Patent No.: US 7,624,426 B1
(45) Date of Patent: Nov. 24, 2009

(54) GAMING MACHINE

(75) Inventor: Kazuo Okada, Tokyo (JP)

(73) Assignee: Aruze Corp, Tokyo (JP)

( * ) Notice: Subject to any disclaimer, the term of this patent is extended or adjusted under 35 U.S.C. 154(b) by 600 days.

(21) Appl. No.: 11/362,519

(22) Filed: Feb. 27, 2006

(51) Int. Cl.
*G06F 17/00* (2006.01)

(52) U.S. Cl. .............................................. 726/1; 463/16

(58) Field of Classification Search ......................... None
See application file for complete search history.

(56) References Cited

U.S. PATENT DOCUMENTS

2004/0106455 A1 * 6/2004 Shinoda ....................... 463/43

FOREIGN PATENT DOCUMENTS

JP 2002-000831 A 1/2002
JP 2003-210694 A 7/2003

* cited by examiner

*Primary Examiner*—Brandon S Hoffman

(74) *Attorney, Agent, or Firm*—Arent Fox LLP

(57) ABSTRACT

Disclosed is a gaming machine. The gaming machine comprises a gaming machine main body that plays a game with a predetermined game medium; a decoration member having identification information memorized therein; mounting means mounted to the gaming machine main body, the decoration member being detachably mounted thereto; effect data memorizing means for memorizing plural effect data including effect data corresponding to the identification information provided to the predetermined decoration member; identification information reading out means for reading out the identification member from the decoration member when the decoration member is mounted to the mounting means; effect data selecting means for selecting the effect data corresponding to the identification information read out by the identification information reading out means from the plural effect data memorized in the effect data memorizing means; and effect means for carrying out an effect, based on the effect data selected by the effect data selecting means.

7 Claims, 21 Drawing Sheets

| Variable display pattern | | losing | ready-to-win losing | big win |
|---|---|---|---|---|
| 00 | Usual variation | 0~99 | — | — |
| 01 | Normal ready | — | 0~69 | — |
| 02 | Normal ready-to-win | — | — | 0~39 |
| 03 | Super ready | — | 70~99 | — |
| 04 | Super ready-to-win | — | — | 40~94 |
| 05 | Entire rotation | — | — | 95~99 |

FIG. 10

100 display effect data table

| variable display pattern command (110) | identification information (120) | display effect data (130) |
|---|---|---|
| variable display pattern command 1 | none | display effect data 11 |
| variable display pattern command 1 | 001 | display effect data 11A(figure symbol) |
| variable display pattern command 1 | 001 | display effect data 11B |
| variable display pattern command 1 | 002 | display effect data 12A(figure symbol) |
| variable display pattern command 1 | 002 | display effect data 12B |
| : | : | : |
| variable display pattern command 2 | none | display effect data 21 |
| variable display pattern command 2 | 001 | display effect data 21A(figure symbol) |
| variable display pattern command 2 | 001 | display effect data 21B |
| variable display pattern command 2 | 002 | display effect data 22A(figure symbol) |
| variable display pattern command 2 | 002 | display effect data 22B |
| : | : | : |
| variable display pattern command 3 | none | display effect data 31 |
| variable display pattern command 3 | 001 | display effect data 31A(figure symbol) |
| variable display pattern command 3 | 001 | display effect data 31B |
| variable display pattern command 3 | 002 | display effect data 32A(figure symbol) |
| variable display pattern command 3 | 002 | display effect data 32B |
| : | : | : |

FIG. 15

| Variable display pattern | | losing | ready-to-win losing | big win |
|---|---|---|---|---|
| 00 | Usual variation | 0~99 | — | — |
| 01 | Normal ready | — | 0~69 | — |
| 02 | Normal ready-to-win | — | — | 0~39 |
| 03 | Super ready | — | 70~99 | — |
| 04 | Super ready-to-win | — | — | 40~94 |
| 05 | Entire rotation | — | — | 95~99 |

GAMING MACHINE

CROSS-REFERENCE TO RELATED APPLICATION

This application is related to a Japanese Patent Application No. 2004-361941, filed on Dec. 14, 2004.

BACKGROUND OF THE INVENTION

1. Field of the Invention

The present invention relates to a gaming machine having a decoration member detachably mounted thereto.

2. Description of Related Art

As an example of the conventional gaming machines, there is a gaming machine comprising a game board having a figure arranged thereto as a decoration member (for example, a Japanese Unexamined Patent Publication No. 2002-831).

In addition, there is also known a gaming machine wherein a decoration member such as figure is mounted at a predetermined position in a game area and is enabled to carry out a predetermined effect action (for example, to notify a big win beforehand), correspondingly to a variable mode of the identification information (special symbol) of a special symbol display device (for example, a Japanese Unexamined Patent Publication No. 2003-210694). In this case, a special symbol (a special symbol representing a big win) situated in the effect action (for example, notification of the big win) of the decoration member is displayed on a liquid crystal screen of the special symbol display device, thereby matching an external appearance of the gaming machine and the effect.

However, according to the conventional gaming machines, since the decoration member (figure, etc.) is unremovably mounted to the game board and a player cannot possess the decoration member, the player has little interest in the decoration member.

In addition, as described above, since the conventional gaming machine are structured on the assumption that the decoration member is unremovably mounted to the game board, it is very difficult to attach a detachable decoration member and to carry out an effect action corresponding to the decoration member. This means that it is impossible to match the attached decoration member and the contents of effect.

SUMMARY OF THE INVENTION

Accordingly, the invention has been made to solve the above-mentioned problems occurring in the prior art. An object of the invention is to provide a gaming machine capable of enabling a player to feel a strong affection for a decoration member and matching the corresponding decoration member and the contents of effect.

In order to achieve the above object, according to the invention, there is provided a gaming machine comprising: a gaming machine main body that plays a game with a predetermined game medium; a decoration member having identification information memorized therein; mounting means mounted to the gaming machine main body, the decoration member being detachably mounted thereto; effect data memorizing means for memorizing plural effect data including effect data corresponding to the identification information provided to the predetermined decoration member; identification information reading out means for reading out the identification member from the decoration member when the decoration member is mounted to the mounting means; effect data selecting means for selecting the effect data corresponding to the identification information read out by the identification information reading out means from the plural effect data memorized in the effect data memorizing means; and effect means for carrying out an effect, based on the effect data selected by the effect data selecting means.

According to the invention, when the detachable decoration member is mounted to the mounting means of the gaming machine main body, an effect is carried out, based on the effect data corresponding to the identification information provided to the corresponding decoration member. Accordingly, it is possible to match the decoration member and the contents of effect. In addition, for example, when a game is over, since a player can separate and possess the decoration member from the mounting means to which the corresponding decoration member is mounted, it is possible to enable the player to feel a strong affection for the decoration member.

BRIEF DESCRIPTION OF THE DRAWINGS

Other and further objects, features and advantages of the invention will appear more fully from the following description taken in connection with the accompanying drawings, in which:

FIG. 10 is a view showing an example of a display effect data table according to an embodiment of the invention;

FIG. 15 is a view showing an example of a variable display pattern selecting table according to an embodiment of the invention;

DESCRIPTION OF THE PREFERRED EMBODIMENTS

Figure 1:
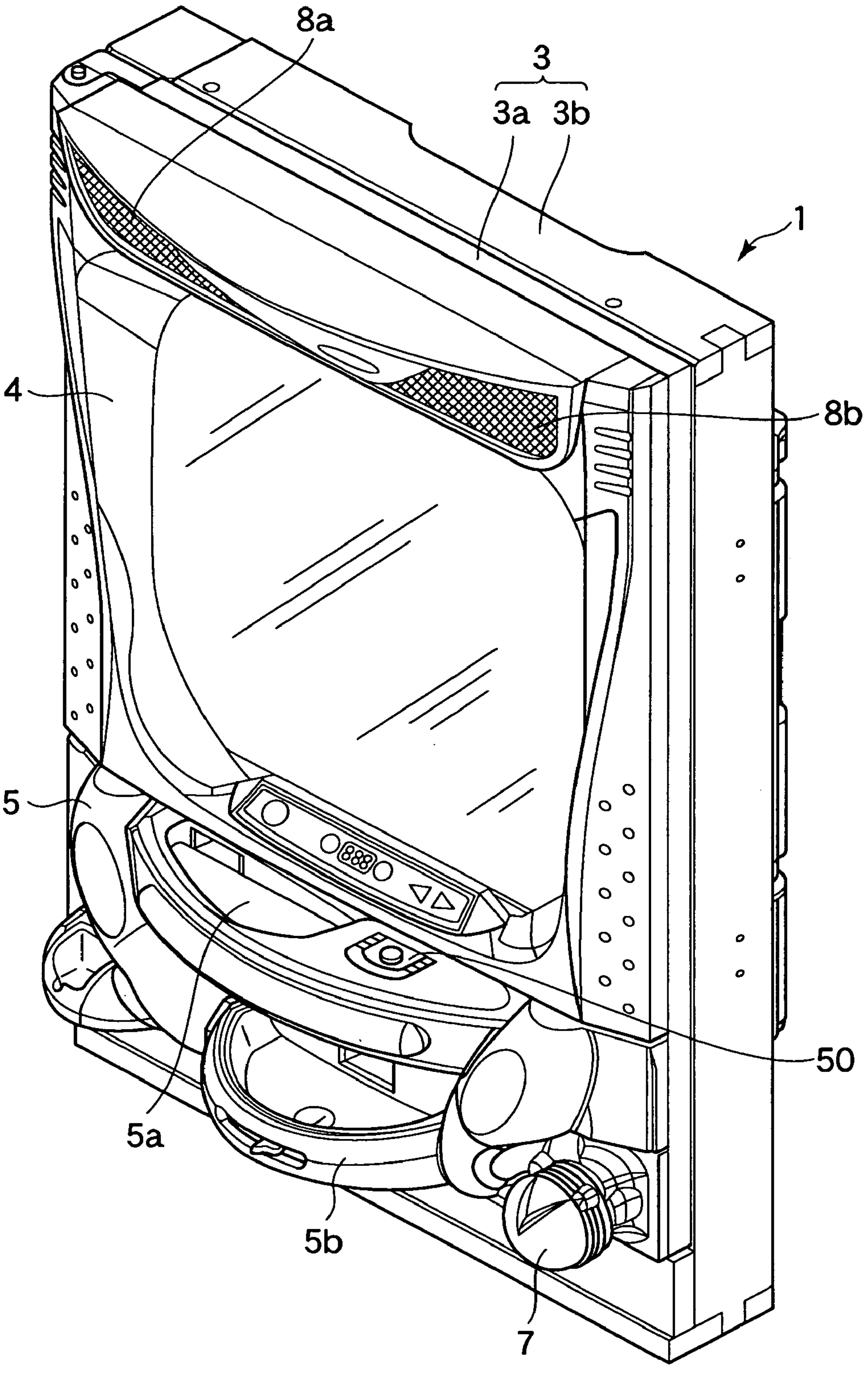
FIG. 1 is a perspective view showing a structure of a gaming machine according to an embodiment of the invention.

Hereinafter, it will be described a preferred embodiment of the present invention with reference to the drawings. In the flowing descriptions, the same reference numerals are used to refer to a same member and the overlapping explanation is omitted. In addition, the descriptions are provided to illustrate a best mode of the invention, not to limit the invention.

Hereinafter, it is described a structure of a bullet ball gaming machine (referred to as a gaming machine) 1, with reference to the drawings. FIGS. 1 to 21 show an embodiment of the gaming machine 1 of a pre-paid card manner.

Figure 2:
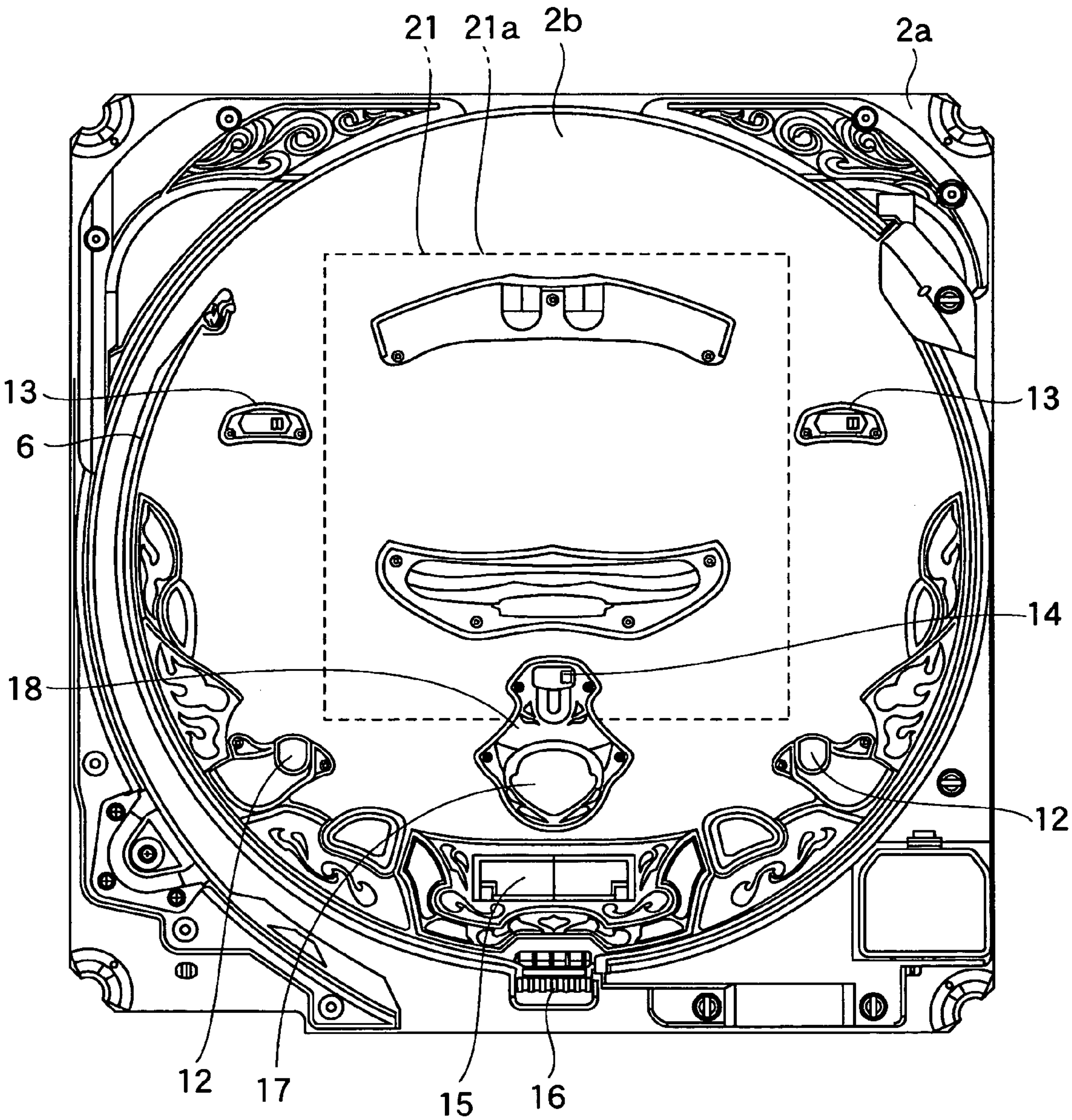
FIG. 2 is a front view of a game board according to an embodiment of the invention.

First, it is described a structure of the pachinko gaming machine 1 with reference to FIGS. 1 and 2. In the mean time, FIG. 1 is a perspective view showing a structure of the gaming machine according to an embodiment of the invention, and FIG. 2 is a front view of a game board according to the embodiment.

As shown in FIGS. 1 and 2, the pachinko gaming machine (gaming machine) 1 comprises a gaming machine main body 3, which consists of a main frame 3*a* having a game board 2*a* (see FIG. 2) mounted thereto and a base frame 3*b*, wherein the main frame 3*a* is rotatably attached to the base frame 3*b* which is fixed to an island equipment through a hinge (i.e., the main frame 3*a* is supported at a rotation supporting point of an end of the main frame 3*a* and attached to the base frame 3*b* to be opened/closed). A glass door 4 enabling the game board 2*a* to be visible and a tray unit 5 located below the glass door 4 are provided to the gaming machine main body 3. The glass door 4 and the tray unit 5 are axis-supported at an end thereof to be rotatable with regard to the gaming machine main body 3 and engaged at the other end with the gaming machine main body 3.

In addition, in the embodiment, the gaming machine main body 3 and the tray unit 5 are defined as a gaming machine main body in a broad sense (hereinafter, referred to as a broad sense of a gaming machine main body).

The game board 2*a* (see FIG. 2) has a game area 2*b* which is surrounded by a rail 6 and enables a gaming ball to move downward. In the game area 2*b*, there is arranged a game member consisting of an obstacle such as plural nails, windmill and the like, a normal winning hole 12, a passage gate 13, a big winning hole 15 which is a changeable winning device, an out slot 16, and an electromotive accessory structure member 18 having start winning holes 14, 17.

In addition, a liquid crystal display device (LCD) 21 having a display area 21*a* capable of displaying an effect image (for example, animation or notification information corresponding to a gaming state) is arranged at a rear of the game board 2*a*.

In addition, the display area 21*a* of the liquid crystal display device 21 comprises an area for displaying an effect image, an ordinary symbol display area (ordinary symbol display device) for variably displaying an ordinary symbol and a special symbol display area (special symbol display device) for variably displaying a special symbol.

In addition, in the embodiment, the display area 21*a* having a square shape may be larger or smaller than the game area 2*b*. In addition, the shape of the display area 21*a* is not limited to the square shape. In other words, the display area may be formed into an arbitrary shape such as a circular shape.

The normal winning hole 12 is a device for paying out a predetermined number of gaming balls when a winning of the gaming ball is made, the passage gate 13 is a device for variably displaying and stopping a plurality of symbols which are displayed in the ordinary symbol display area when the gaming ball passes to it, the start winning holes 14, 17 are devices for variably displaying and stopping a special symbol which is displayed in the special symbol display area on condition that a winning of the gaming ball is made, and the big winning hole 15 is a device which is controlled so that the door is opened or opened as the predetermined number of times under predetermined condition in accordance with a predetermined setting when a combination of special symbols at the stopping time of the special symbol display area becomes a combination of specific symbols preset (a big win display mode) and thus a gaming state is shifted to a big win gaming state (the big win gaming state is meant by a state in which a so-called big win occurs) (i.e., the big winning hole 15 is opened only when the number of the gaming ball passing to a specific area of the big winning hole 15 within a predetermined time period is 1 or more (i.e., as long as there no-passage does not occur), so that it is changed as the predetermined number of times between an opened state at which it is easy to accept the gaming ball and a closed state at which it is difficult to accept the gaming ball. In the mean time, the changing operation between the opened state and the closed state is referred to as a round operation).

The out slot 16 is a device in which the gaming ball whose winning is not made in any of the normal winning hole 12, the start winning holes 14, 17 and the big winning hole 15 is collected.

The liquid crystal display device 21 which is variable display means is a device for displaying any image in the display area 21*a*, based on an instruction from an image control circuit 305 which will be described later.

In addition, in the embodiment in which the game board 2*a* is clear, the display area 21*a* of the liquid crystal display device 21 can be visible through the game board 2*a*. In addition to the liquid crystal display device 21, a CRT (Cathode Ray Tube) or plasma display can be used.

As shown in FIG. 1, the tray unit 5 is arranged below the game board 2*a*. An upper tray 5*a* is arranged above the tray unit 5, in which the paid out gaming ball and the gaming ball shot in the game area are deposited, and a lower tray 5*b* is arranged below the tray unit 5, in which the gaming balls overflowing the upper tray 5*a* through the payout are deposited. In addition, a shutter lever (not shown), which is manipulated in case of moving the gaming ball deposited in the upper tray 5*a* into the lower tray 5*b* at the time of the game ending, and a base 50 (which will be described in detail) to which a decoration member is mounted are arranged in predetermined positions of the upper tray 5*a*.

To a right side of the tray unit 5 is mounted a handle 7 which is rotation-operated when the gaming ball is shot to the game area of the game board 2*a* thorough the rail 6. The handle 7 is provided with a stop button (not shown) for stopping the shooting of the gaming ball.

In addition, speakers 8*a*, 8*b* are mounted at upper left and right sides above the glass door 4.

The passage gate 13 is adapted to detect the gaming ball which passes to it. The passing ball of the passage gate 13 is adapted such that a reservation memory thereof can be made, and it is carried out a variable display of a symbol in the ordinary symbol display area, based on the passing memory information. In addition, to an upper right side of the game area 2*b* are four ordinary symbol memory LEDs (not shown) for displaying the passing memory-number of the passage gate 13. The passing memory-number of the gaming balls having passed to the passage gate 13 can be displayed by the number of the LEDs turned on.

In the ordinary symbol display area, for example two ordinary symbols are adapted to be alternately turned on or off. When the lighting-up and lights-out of the two ordinary symbols are ended and thus a "win" is displayed, the start winning hole 17 provided to the electromotive accessory structure member 18 is switched to a state under which it is easy to accept the gaming ball for a predetermined time period.

In addition, it may be such structured that the two ordinary symbol display LEDs are provided to any place of the game board 2*a*, rather than the ordinary symbol display area and a "win" is displayed by the lighting-up and lights-out of the LEDs. In addition, the two ordinary symbol display LEDs may consist of 7 segment displayers, for example. In this case, the numbers, for example "0", "1", "2", "7", "8", "9" are variably displayed as the ordinary symbol to be displayed on the 7 segment displayers and a "win" is determined when the stopped number is "3" or "7".

The start winning hole 17 is provided with a receiving slot accepting the gaming ball and is a device having an opening/closing unit capable of being switched between a state at which it is easy to accept the gaming ball and a state at which it is difficult to accept the gaming ball. The start winning hole 17 is under state at which it is difficult to accept the gaming ball in a usual state and then can be switched into the state at which the hole is opened for a predetermined time period (for example, 0.3 second) and thus it is easy to accept the gaming ball, when a predetermined condition is fulfilled (for example, when the ordinary symbol of the ordinary symbol display area is stopped at a symbol representing a "win"). In addition, when a winning of the gaming is made in the receiving slot, the predetermined number of gaming balls is paid out.

In addition, the winning ball for the start winning holes 14, 17 is adapted such that a winning memory thereof can be made. A variable display of the special symbol is carried out in the special symbol display area on the basis of the winning memory. Four special symbol memory LEDs (not shown) for displaying the winning memory-number for the start winning holes 14, 17 are arranged at a center of the game area 2*b*. The winning memory-number for the start winning holes 14, 17 can be displayed by the number of the special symbol memory LEDs turned on.

In addition, the special symbol to be displayed in the special symbol display area consists of three rows of numerals such as "0", "1", "2", "9", and the numerals are variably displayed when a winning of the gaming ball is made in the start winning hole 17. In the mean time, when the variable display of the numerals are ended and a result of the variable display (i.e., a combination of numerals stopped and referred to as stop symbols) becomes a predetermined pattern in which three same numbers are arranged such as ("0", "0", "0"), ("7", "7", "7"), a combination of special symbols at that time is referred to as a big win display mode (big win symbol). The big win display mode is a display mode for enabling a player to perceive that a gaming state is shifted to a big win gaming state (i.e., a "big win" is made) which is advantageous to the player, as compared to a base gaming state. In the mean time, a result of the variable display except the big win display mode is referred to as a non-big win display mode (losing symbol).

In addition, the big win gaming state is a gaming state at which a big winning hole SOL 72S opens and closes the door of the big winning hole 15 by the predetermined number of times, so that a winning of the more gaming balls is easily made, as compared to the base gaming state.

In the mean time, the big win display mode for enabling a player to perceive that a gaming state is shifted to the big win gaming state is divided into a special display mode (probability variation big win symbol) which is a display mode representing a probability variation big win and a non-special display mode (usual big win symbol) which is a display mode representing a usual big win.

In addition, the special display mode is a case where three predetermined numerals such as "7" or "3" are matched, and the non-special display mode is a case where three numerals except the special display mode are matched.

In the mean time, when a variable display result of the special symbol becomes the special display mode (i.e., probability variation big win), the gaming state is shifted to a special gaming state (probability variation state) at which it is higher a probability that a variable display result of the special symbol in the special symbol display area will be the big win display mode after the big win gaming state is over. In the mean time, when a display mode of the special symbol becomes the non-special display mode (i.e., usual big win), the gaming state is shifted to the base gaming state after the big win gaming state is over.

In addition, in the embodiment, the winning memory-number and the passing memory-number are respectively displayed by the ordinary symbol memory LEDs and the special symbol memory LEDs. However, the invention is not limited thereto and they may be displayed by another display method. For example, they may be displayed in the display area 21*a*.

Figure 3:
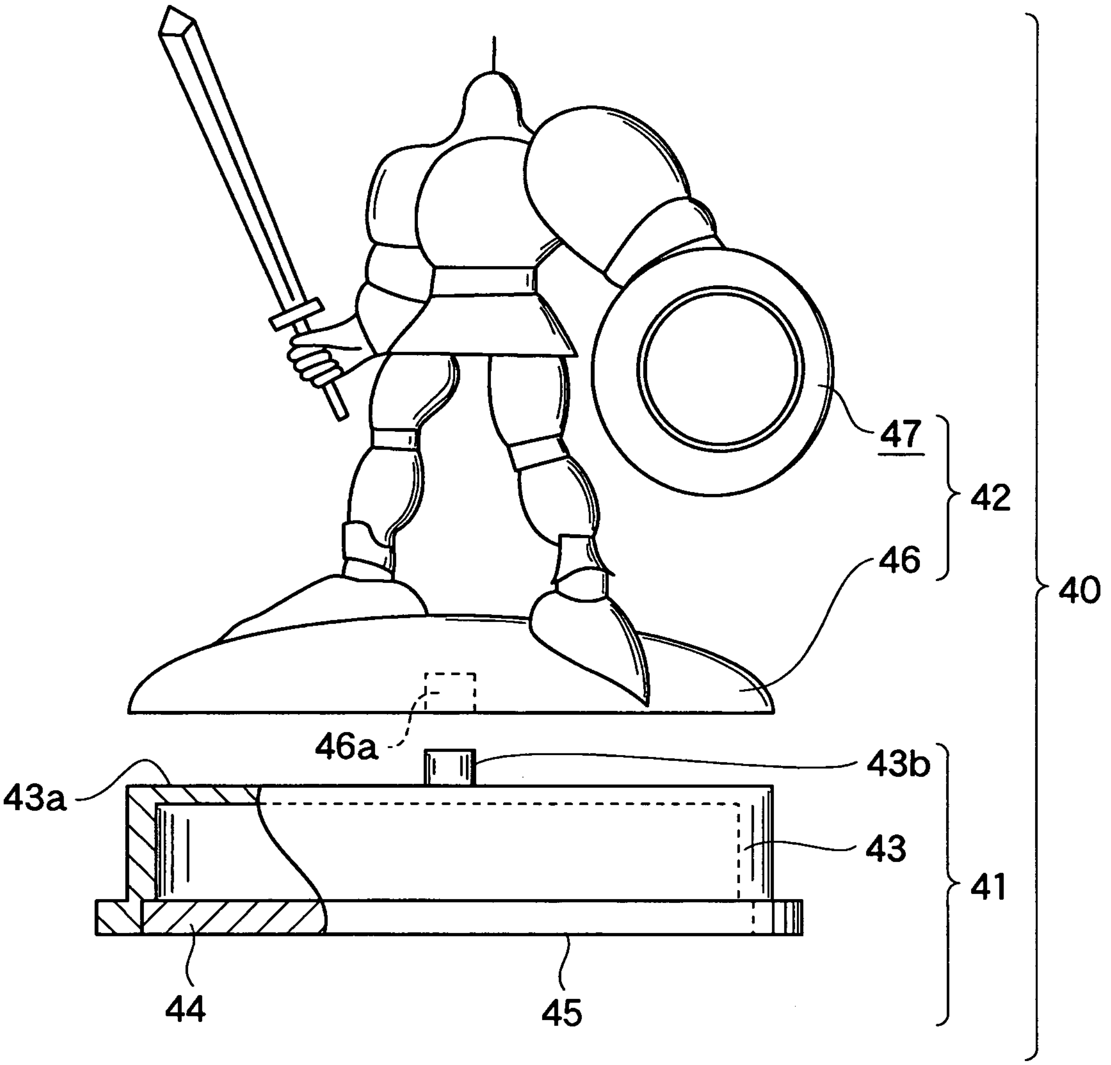
FIG. 3 is an exploded perspective view showing a structure of a decoration member according to an embodiment of the invention.

In the followings, it is described a structure of a decoration member 40 with reference to FIG. 3. In the mean time, FIG. 3 is an exploded perspective view showing a structure of a decoration member according to an embodiment of the invention.

The decoration member 40 is a decoration member (hereinafter, referred to as a figure) such as figures corresponding to plural characters. As shown in FIG. 3, the decoration member comprises a base portion 41 and a figure main body 42 expressing a solid shape of each character and is detachably mounted to a base 50 which will be described later. In the mean time, a bottom of the base portion 41 becomes a bottom section 45.

The base portion 41 has a size corresponding to a base mounting part 51 (see FIG. 4) and is formed into a hollow thick disk shape. The base portion 41 comprises a cylindrical bottomed base main body 43 having a ceiling section 43*a* and an IC chip 44. A protrusion 43*b* is provided to a center of the ceiling section 43*a* of the base main body 43 and the IC chip 44 is fitted in an opened end of the base main body 43. In addition, an annular protrusion is formed at a periphery of the opened end to constitute the bottom section 45. The IC chip 44 memorizes the identification information (identification information inherent to a character) corresponding to the figure main body 42.

The figure main body 42 comprises a leg resting section 46 having a recess 46*a* corresponding to a protrusion 43*b* and a figure part 47 adapted to stand up straight from the leg resting section 46 with two legs and imitating each character. The protrusion 43*b* is fitted into the recess 46*a*, so that the figure main body is fixed to the ceiling section 43*a* of the base portion 41.

The player can distinguish the FIG. 40 in accordance with the shape of the figure main body 42 and the pachinko gaming machine 1 can discriminate the figure through the inherent identification information. In the embodiment, the inherent identification information (hereinafter, referred to as figure ID) corresponding to the FIG. 40 (specifically, figure main body 42) has a same unique with regard to the same FIG. 40. In other words, in plural figures having the types different from each other, a same figure ID is provided to correspond to a same type of a figure. For example, if there are 5 types of figures, 5 figure IDs are provided.

Figure 4:
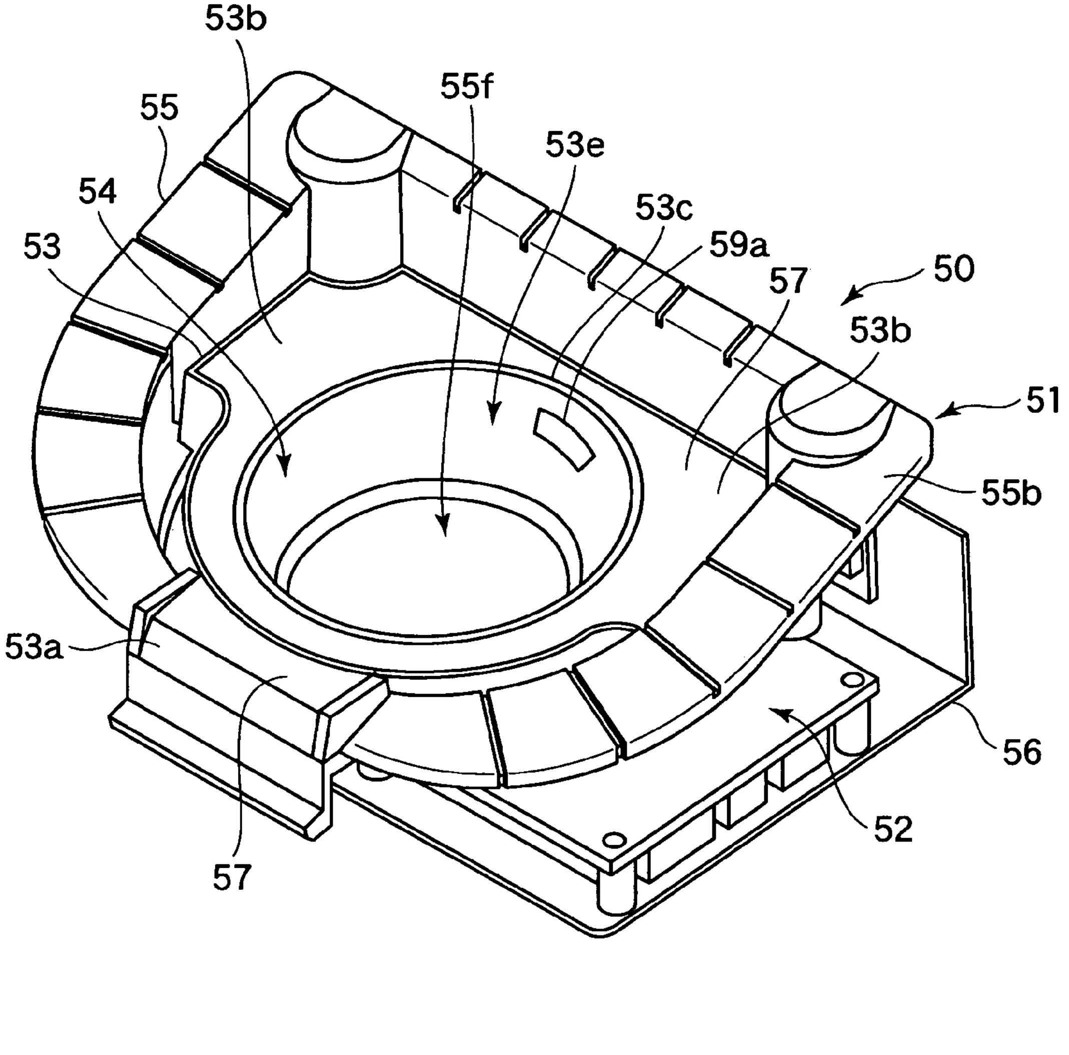
FIG. 4 is a perspective view of a base according to an embodiment of the invention.
Figure 5:
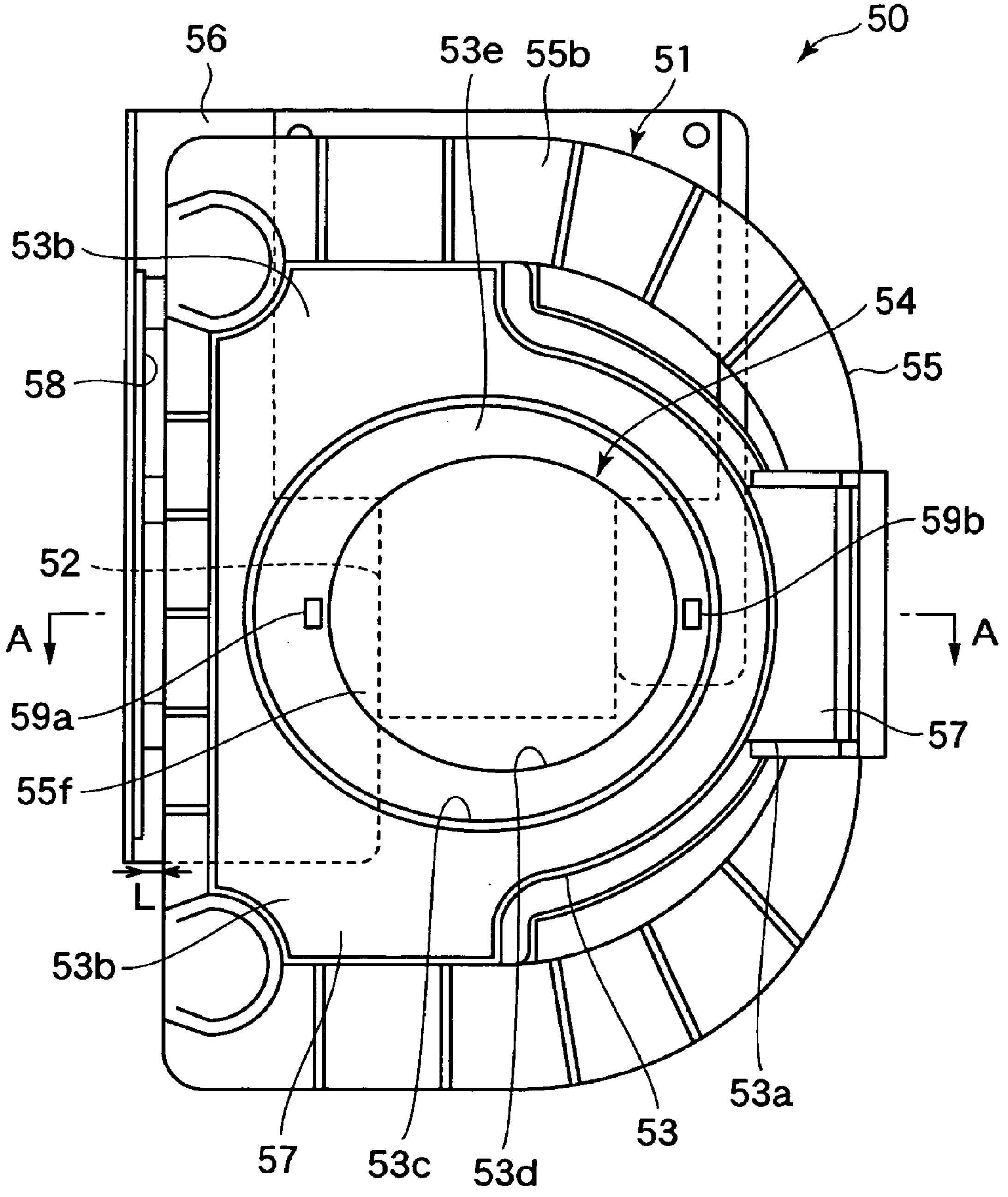
FIG. 5 is a plan view of a base according to an embodiment of the invention.
Figure 6:
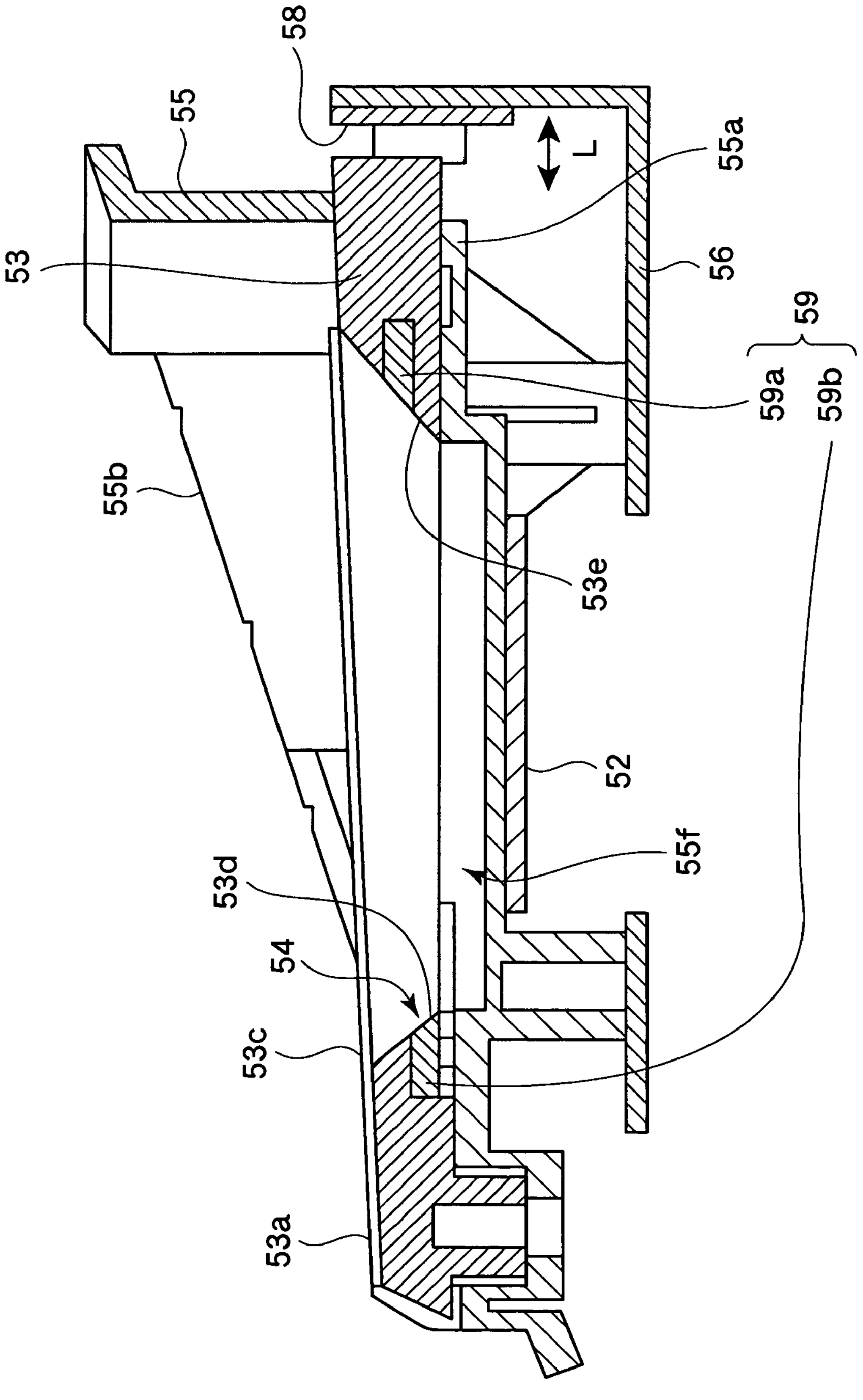
FIG. 6 is a sectional view taken along a line A-A shown in FIG. 5.

In the followings, it is described a structure of a base 50 to which the detachable FIG. 40 is mounted and which is mounted at a predetermined position of the upper tray 5*a*, with reference to FIGS. 4 to 6. In the mean time, FIG. 4 is a perspective view showing a base according to an embodiment, FIG. 5 is a plan view of the base and FIG. 6 is a sectional view taken along a line A-A shown in FIG. 4.

The base (mounting means) 50 is mounted to the main body of the gaming machine main body in a broad sense and has a structure to which the FIG. 40 is detachably mounted.

As shown in FIG. 4, the base 50 comprises a base mounting part 51, an IC chip reader 52 for reading out the figure ID memorized in the IC chip 44 of the FIG. 40 and a photo sensor 59 for detecting that the FIG. 40 is mounted at a readable position of the figure ID which can be read out by the IC chip reader 52. Hereinafter, it will be specifically described with reference to FIGS. 4 to 6.

The base mounting part 51 comprises a guide member 53 having a guide opening 54 therein and consisting of a light transmitting member such as transparent urethane, a support frame 55 for supporting the guide member 53 from a periphery and a lower part and a pedestal 56 for fixing the support frame 55 and the guide member 53 to the upper tray 5*a* (see FIG. 1) provided to the gaming machine main body in a broad sense.

The guide member 53 is formed into an approximate disc shape having the guide opening 54 therein and provided with a protrusion 53*a* at a front side (toward the player) and widened sections 53*b*, 53*b* at a rear side. A bottom of the protrusion 53*a* of the guide member 53 is assembled to the support member 55 and the widened sections 53*b*, 53*b* are fitted thereto.

In addition, the guide member 53 is formed with a circular opening 53*d* of a side of the pedestal 56 (a side closed by a seat 55*a* of the support frame 55) facing the guide opening 54 and a circular open end 53*c* of an opened side thereof. A diameter of the open end 53*c* is larger than that of the opening 53*d* and a peripheral surface between the open end 53*c* and the opening 53*d* is shaped into a conical inclined surface 53*e* whose diameter is gradually reduced from the open end 53*c* to the opening 53*d*. A shape of the opening 53*d* corresponds to that of the bottom section 45 of the FIG. 40, which can be inserted into the opening.

The support frame 55 comprises an annular frame body 55*b* surrounding the guide member 53, a support bearing section 55*a* concaved in the frame body 55*a* and supporting the guide member 53 and a cylindrical depression 55*f* formed to have a step at a center of the support bearing section 55*a*. An opening of the depression 55*f* is concentric with the opening 53*d* of the guide member 53 and has a diameter same as that of the opening 53*d*. In addition, a bottom of the depression 55*f* is a circular plane corresponding to the opening 53*d* and a peripheral surface of the depression 55*f* is a cylindrical surface corresponding to the opening 53*d*. As a consequence, the depression 55*f* is structured to correspond to the external shape of the bottom section 45 of the FIG. 40 and thus to receive the bottom section 45 therein.

The photo sensor 59 comprises a light emitting part 59*a* for emitting the light such as infrared toward a light receiving part 59*b* and a light receiving part 59*b* capable of receiving the light from the light emitting part 59*a*. In addition, the light emitting part 59*a* is provided to the conical inclined surface 53*e* at the rear of the guide member 53 and the light receiving part 59*b* is provided to the conical inclined surface 53*e* opposite to the light emitting part 59*a* with the opening 53*d* being located therebetween. Accordingly, the light emitting part 59*a* and the light receiving part 59*b* of the photo sensor 59 are positioned to be opposite to each other with an entrance path of the bottom section 45 facing the depression 55*f* being located therebetween. When the bottom section 45 is received in the depression 55*f*, the light which is received in the light receiving part 59*b* is interrupted by the FIG. 40. As a result, the photo sensor can detect that the FIG. 40 is located at a reading position.

A detection signal representing whether the FIG. 40 is mounted at the reading position (i.e., whether the FIG. 40 is mounted at the base 50) is transmitted to a sub-control circuit 300 from the photo sensor 59.

When the figure (decoration member) 40 is mounted at the base (mounting means) 50, the IC chip reader 52 serves as the identification information reading out means for reading out the figure ID (identification information) from the corresponding FIG. 40 and comprises an antenna or wireless circuit on a convex board. The antenna is fixed to the pedestal 56 so that it is located adjacent to the center of the bottom of the depression 55*f* so as to read out the identification information (referred to as figure ID) provided to the FIG. 40 when the bottom section 45 of the FIG. 40 (see FIG. 6) is accommodated in the depression 55*f*. In the mean time, when the bottom section 45 is accommodated in the depression 55*f*, it is possible to read out the figure ID at the position (reading position) with the IC chip reader 52.

As described above, when the FIG. 40 is mounted to the base 50, the IC chip reader 52 can read out the figure ID through the communication with the IC chip 44 of the FIG. 40. However, in the embodiment, in order to authenticate the figure with a sub-control circuit 300, the IC chip reader 52 reads out the figure ID through the communication with the IC chip 44 when there is a request for the reading of the figure ID from the sub-control circuit 300 and transmits the read figure ID to the sub-control circuit 300.

Full color LEDs 58 which are a light source are mounted at the rear of the guide member 53 at an interval L (about 5 mm). In addition, a black light-shielding seal 57 is attached to a place which is not surrounded by the support frame 55, except the conical inclined surface 53*e*, with regard to the outer periphery of the guide member 53. The full color LEDs 58 are supplied with the power from a driving circuit (not shown) to emit the light toward the guide member 53. Then, the light having transmitted the guide member 53 is discharged from the conical inclined surface 53*e.*

Figure 7:
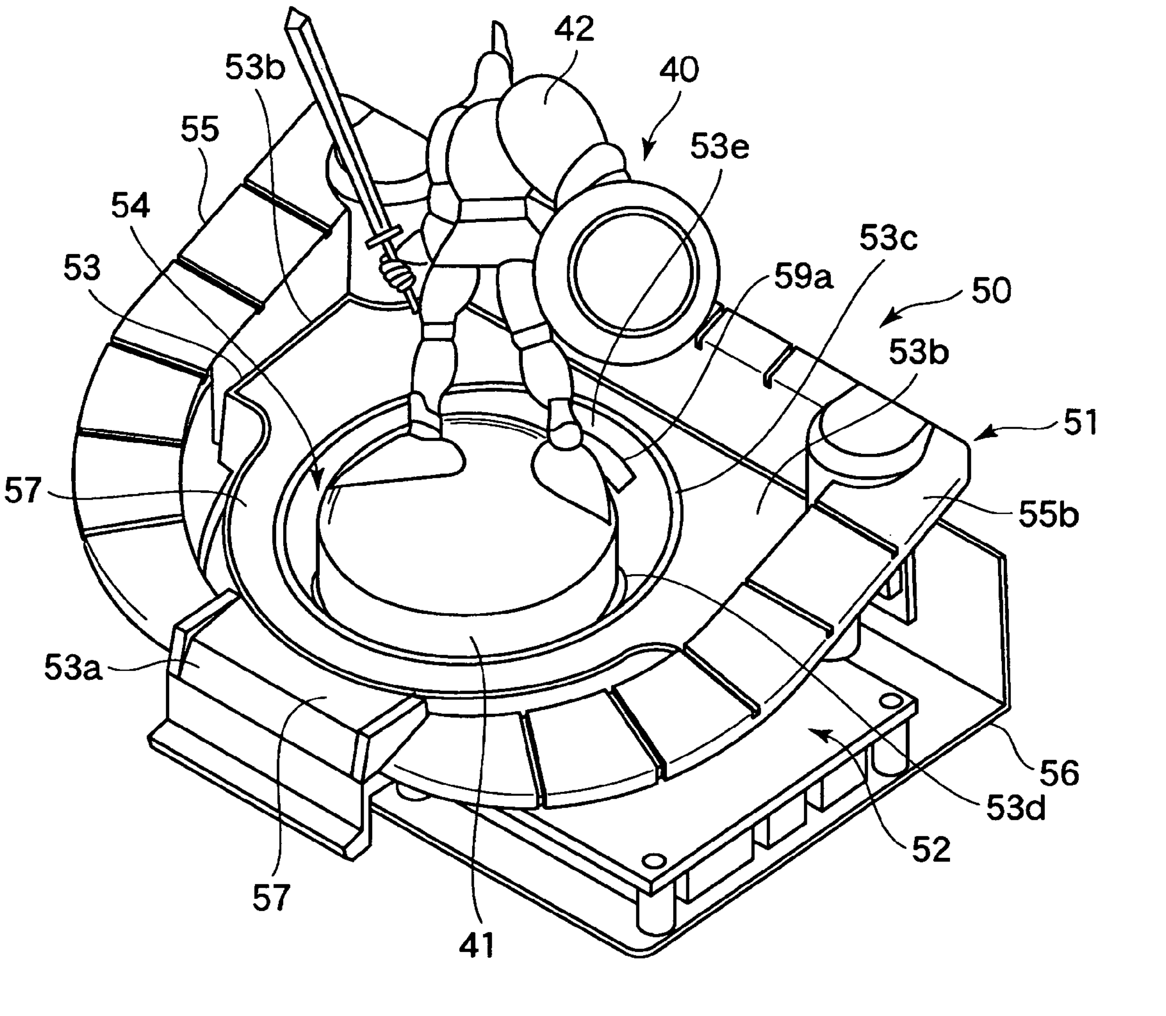
FIG. 7 is a perspective view showing a decoration member mounted to a base, according to an embodiment of the invention.

FIG. 7 shows that the FIG. 40 (specifically, bottom section 45) shown in FIG. 3 is mounted to the base 50 (specifically, depression 55*f*) shown in FIG. 4. In the mean time, FIG. 7 is a perspective view showing the FIG. 40 mounted to the base 50.

Figure 8:
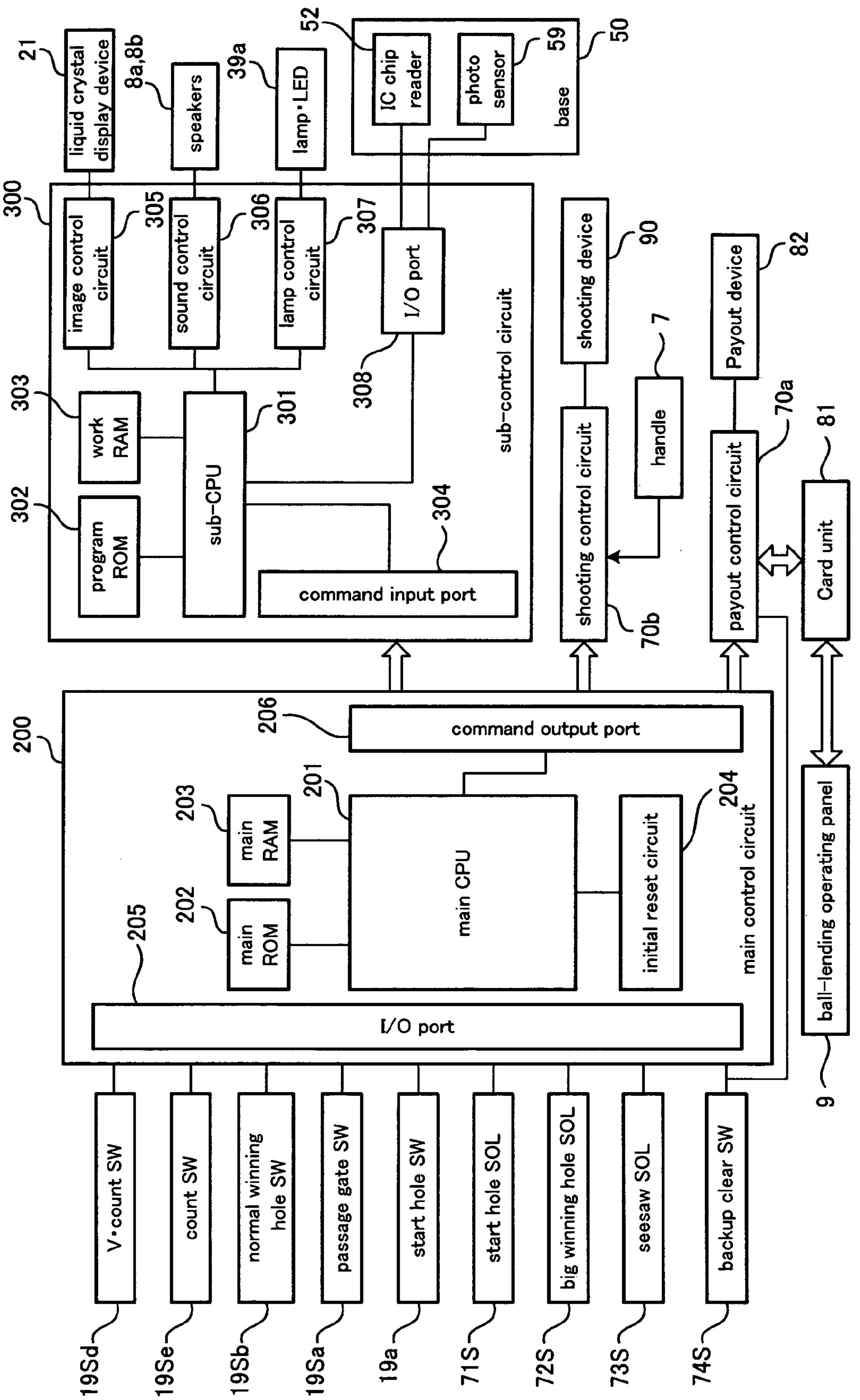
FIG. 8 is a block diagram showing a control system of the gaming machine shown in FIG. 1.

In the followings, it is described a control system of the pachinko gaming machine 1 shown in FIG. 1, with reference to FIG. 8. In the mean time, FIG. 8 is a block diagram showing a control system of the gaming machine shown in FIG. 1.

The control system of the pachinko gaming machine 1 comprises a main control circuit 200 and a sub-control circuit 300, a payout control circuit 70*a* and a shooting control circuit 70*b* which are connected to the main control circuit 200. The control system is mounted at the rear of the game board 2*a*.

A card unit 81 is connected to the payout control circuit 70*a* of the pachinko gaming machine 1.

The card unit 81 is mounted adjacent to the pachinko gaming machine 1 and is formed with an insertion slot through which a pre-paid card can be inserted. The card unit comprises means for reading out the record information recorded in the pre-paid card inserted into the insertion slot, means for outputting a lending command signal to instruct the payout control circuit 70*a* to lend a gaming ball in accordance with the operation of a ball-lending operating panel 9 and means for subtracting the number of lending balls instructed by the output means from the possible number of lending balls specified by the record information read out by the reading means and recording the corresponding information to the pre-paid card inserted into the insertion slot.

The main control circuit 200 is provided with a main CPU (subminiature arithmetic processing device) 201 for carrying out a game process of the pachinko gaming machine 1 in accordance with a preset program, an initial reset circuit 204 for generating a reset signal so as to restore the various settings to initial values thereof when there occurs an abnormal situation or when the power is inputted, a main RAM 203 for memorizing various data or command necessary for the operations of the main CPU 201 and a main ROM 202 for storing a program to control the game progress of the gaming machine 1, a big win determining table which is referred to when it is carried out a big win determination by a random number lottery, an ordinary win determining table which is referred to when it is carried out an ordinary win determination by a random number lottery, a win variable display pattern determining table and a losing variable display pattern table which are referred to when it is determined a variable display pattern of a special symbol by a random number lottery, an effect image display pattern determining table which is referred to when it is determined an effect image (effect information image) such as character image or background image by a random number lottery and various probability tables which are referred to when it is carried out a lottery for the other effects.

The main RAM 203 is provided with a winning memory counter for memorizing a winning memory-number (the number of winning balls regarding the start winning holes 14, 17) counted by the main CPU 201, a passing memory counter for memorizing the passing memory-number (the number of balls having passed to the passage gate 13) counted by the main CPU 201, a big winning hole-winning counter for memorizing the number of gaming balls which are accepted in the big winning hole 15 during one time round and a counter for memorizing the number of cases where the big winning hole 15 is opened during one big win gaming state.

The main CPU 201 has each functions of means for determining a variable display pattern, means for controlling a big win gaming state, means for determining a gaming state (big win gaming state determining means and special gaming state determining means), means for shifting a gaming state, means for controlling a winning hole SOL and means for controlling a game.

The means for determining a variable display pattern is provided to generate and set a variable display pattern when a predetermined start condition is fulfilled. The means carries out a big win determining process when a winning of the gaming ball is made in the start winning holes 14, 17 and thus there occurs a start winning, and determines a variable display pattern for carrying out a variable display of the special symbol, based on a result of the big win determining process.

Specifically, the means for determining a variable display pattern regards a predetermined start condition as fulfilled when there occurs a start winning and generates, and generates and sets a variable display pattern command instructing a variable display pattern for carrying out a variable display of the special symbol or effect information and a command instructing a stop symbol of the variable display, based on a result of the big win determination.

The variable display pattern includes a special symbol display pattern and an effect information display pattern. Accordingly, the variable display pattern command includes the data for instructing the special symbol display pattern and the data for instructing the effect information display pattern.

The special symbol display pattern is a variable display pattern of a special symbol which is variably displayed in the special symbol display area, for example three special symbols. In addition, the special symbol display pattern also includes the display time information representing the respective display time of the three special symbols (for example, "left", "center" and "right"). Accordingly, the special symbol display pattern includes the display pattern and the time information.

In addition, the effect information display pattern is a pattern related to a display of the effect information such as character. Accordingly, it is prepared the effect information display patterns in correspondence with the number of characters and it is indicated (instructed) an effect information display pattern of the effect information (effect information image) which is actually displayed, among the plural effect information display patters.

The means for controlling a big win gaming state carries out a control of the big win gaming state which is advantageous to the player, when a display result of the liquid crystal display device 21 becomes a predetermined big win display mode.

The means for determining a gaming state is provided to determine a predetermined gaming state when a winning of the gaming ball is made in the start winning holes 14, 17 provided to the game area 2*b*, and is divided into big win gaming state determining means and special gaming state determining means.

The big win gaming state determining means determines to shift a gaming state to a big win gaming state which is advantageous to the player when a winning of the gaming ball is made in the winning holes (start winning holes 14, 17) provided to the main body of the gaming machine main body in a broad sense (or the gaming machine main body 3).

The special gaming state determining means determines to shift a gaming state to a special gaming state which is a gaming state at the time when the big win gaming state, which is advantageous to the player, is over and in which it is high a probability that a big win gaming state will be made next time.

For example, the big win gaming state determining means carries out a big win determining process, based on a random number value for determining a big win which is sampled by a random number lottery, when a winning of the gaming ball is made in the start winning holes 14, 17. When it is determined that it is made a big win through the determining process, the means determines to shift a gaming sate to a big win gaming state.

The big win includes a usual big win and a probability variation big win. In case of the probability variation big win, the control authority is shifted to the special gaming state determining means from the big win gaming state determining means. The special gaming state determining means determines to shift a gaming state to a special gaming state after the big win gaming state is over.

The means for shifting a gaming state shifts a gaming state to a predetermined gaming state which is determined by the means for determining a gaming state.

The means for controlling a wining hole SOL controls a big winning hole SOL 72S to open/close the door of the big winning hole 15 (to open the big winning hole), when the gaming state is shifted to the big win gaming state.

The means for controlling a game carries out an operation which forms a 1 round from after the big winning hole 15 is opened under big win gaming state by the big winning hole SOL control means until it is closed.

The programs for embodying the functions of the respective means are stored in the main ROM 202. The main CPU 201 may load and execute the respective programs from the main ROM 202 to the main RAM 203, thereby embodying the above functions of the respective means. It is needless to say that the respective means may consist of a dedicated hardware.

In addition, the main CPU 201 carries out a process of determining contents which are displayed in the ordinary symbol display area, and the like.

The main CPU 201 carries out the functions of the respective means to transmit various commands, such as a command related to a game effect instruction, to the sub-control circuit 300 to execute the corresponding effect.

The command related to a game effect instruction includes a command related to a display effect instruction by the display means such as liquid crystal monitor, a command related to a sound effect instruction by sound generating means such as speaker and a command related to a light effect instruction by the light emitting means such as lamp or LED.

In addition, the command related to a display effect instruction includes various commands such as variable display pattern command.

The variable display pattern command includes the data for instructing the special symbol display pattern and the effect information display pattern, respectively, as described above.

To the I/O port 205 of the main control circuit 200 is connected a passage gate SW 19Sa which is a sensor for detecting a passing of the gaming ball and a start hole SW 19*a* which is a sensor for detecting a gaming ball whose winning is made in the start winning holes 14, 17, which sensors are mounted in the passage gate 13.

In addition, to the I/O port 205 is connected a V count SW 19Sd which is a sensor mounted to a continuation winning hole in the big winning hole 15 and detecting a gaming ball whose winning is made, a count SW 19Se which is a sensor mounted to the ordinary winning hole in the big winning hole 15 and detecting a gaming ball whose winning is made, a normal winning hole SW 19Sb which is a sensor detecting a gaming ball whose winning is made in the normal winning hole 12 and a backup clear SW 74S for erasing the various data memorized in the main RAM 203.

In addition, to the I/O port 205 is connected sensors such as a shooting ball sensor (not shown) for detecting a gaming ball which is shot from the shooting device 90 through the operation of the handle 7 and a return ball sensor (not shown) for detecting a gaming ball which is shot but returned to the rail 6 without reaching the board surface of the game board 2*a*, and actuators such as a movable member SOL (solenoid) 71S for switching the start winning hole 17 between a state at which it is easy to accept the gaming ball and a state at which it is difficult to accept the gaming ball, a big winning hole SOL (solenoid) 72S for opening and closing the door of the big winning hole 15 and a seesaw SOL (solenoid) 73S for driving a seesaw in the big winning hole 15.

When the respective sensors detect the gaming ball, a detection signal is inputted to the main CPU 201 of the main control circuit 200. Thereby, the main CPU 201 controls the driving of the actuators 71S, 72S, 73S in accordance with the inputted detection signal.

The control commands are transmitted to the sub-control circuit 300, the payout control circuit 70*a* and the shooting control circuit 70*b* from a command output port 206 of the main control circuit 200.

The sub-control circuit 300 having received the control command controls the operations of the liquid crystal display device 21, the speakers 8*a*, 8*b* and the lamp LED 39*a*, and the payout control circuit 70*a* and the shooting control circuit 70*b* having received the control commands control the operations of a payout device 82 and the shooting device 90.

The payout control circuit 70*a* is connected to the payout device 82 for paying out an award ball or lending ball. The payout control circuit 70*a* controls the driving of the payout device 82 and pays out a predetermined number of gaming balls as an award ball, in accordance with the payout command signal outputted from the main control circuit 200, on condition that the gaming ball is accepted in the normal winning hole 12 and the big winning hole 15. In addition, the payout control circuit 70*a* controls the driving of the payout device 82 and pays out a predetermined number of gaming balls as a lending ball, in accordance with a lending command signal outputted from the card unit 81.

The shooting control circuit 70*b* is connected to the shooting device 90 for shooting the gaming ball toward the game area 2*b*. In addition, the shooting control circuit 70*b* controls the driving of the shooting solenoid to shoot the gaming ball from the shooting device 90, in accordance with the rotating operation of the handle 7.

In the followings, it is described a structure of the sub-control circuit 300. The sub-control circuit 300 is provided with a sub-CPU 301, a program ROM 302, a work RAM 303, a command input port 304, an image control circuit 305, a sound control circuit 306, a lamp control circuit 307 and an I/O port 308.

The sub-CPU 301 has the respective functions of effect data selecting means for selecting one effect data from the plural effect data depending on the games and effect control means for controlling the effect means such as display means, sound generating means and light emitting means, based on the effect data selected by the effect data selecting means.

The effect data selecting means selects one effect data from the plural effect data memorized in the program ROM (effect data memorizing means) 302 in accordance with the instruction from the main control circuit 200.

In selecting one effect data, when it is determined that the gaming state is shifted to the big win gaming state by the big win gaming state determining means (main CPU 201), the effect data selecting means selects the first effect data corresponding to the identification information (figure ID) which is read out by the identification information reading means (IC chip reader 52) and provided to the predetermined decoration member (figure) and including the effect information related to the corresponding predetermined decoration member in a high probability, as compared to the second effect data not including the effect information related to the corresponding predetermined decoration member.

In addition, in selecting one effect data, when it is determined that the gaming state is shifted to the special gaming state (for example, probability-variation) by the special gaming state determining means (main CPU 201), the effect data selecting means selects the first effect data corresponding to the identification information (figure ID) which is read out by the identification information reading means (IC chip reader 52) and provided to the predetermined decoration member (figure) and including the effect information related to the corresponding predetermined decoration member in a high probability, as compared to the second effect data not including the effect information related to the corresponding predetermined decoration member.

In addition, the sub-CPU 301 requests the IC chip reader 52 to read out the figure ID through the I/O port 308, based on the detection signal received from the photo sensor 59 via the I/O port 308 and representing that the FIG. 50 is mounted to the base 50. Next, the sub-CPU 301 receives the figure ID from the IC chip reader 52 which has read out the figure ID from the IC chip 44 in accordance with the request.

In addition, the sub-CPU 301 analyzes the command which is received from the main control circuit 200 via the command input port 304 and controls the image control circuit 305, the sound control circuit 306 and the lamp control circuit 307, based on the analysis result or the analysis result and the figure ID which is received from the IC chip reader 52 via the I/O port 308.

The work RAM 303 serves as temporary memory means when the sub-CPU 301 carries out the process control in accordance with the control program and is allotted a receiving buffer area (not shown) for memorizing a command from the main CPU 201, an ID memory area (not shown) for memorizing a figure ID received from the IC chip reader 52 via the I/O port 308 and a work area (not shown) for memorizing the data necessary for the process control.

The program ROM 302 stores control programs (control data) for enabling the sub-CPU 301 to control the image control circuit 305, the sound control circuit 306 and the lamp control circuit 307 on the basis of the various commands outputted from the main control circuit 200.

In addition, the program ROM 302 has a function of the effect data memorizing means for memorizing the plural effect data comprising the first effect data corresponding to the identification information (figure ID) provided to the predetermined decoration member (figure) and including the effect information related to a predetermined decoration member and the second effect data not including the effect information related to the corresponding predetermined decoration member.

The effect data memorizing means memorizes the effect data related to a display effect, the effect data related to a sound effect and the effect data related to a light effect which are respectively patterned. The effect data related to the respective effects consists of the plural effect data including the first effect data and the second effect data, as described above.

In the embodiment, the program ROM 302 memorizes not only the effect data corresponding to the figure ID provided to one predetermined figure but also the plural effect data corresponding to the figure IDs (identification information) which are respectively provided to the plural detachable figures (decoration members) having types different from each other.

Herein, the effect data related to the display effect is defined as the display effect data. The display effect data includes the special symbol display pattern data representing a special symbol display pattern for the image control circuit 305 to variably display a special symbol in the liquid crystal display device 21 and the effect information display pattern data representing an effect information display pattern for the image control circuit 305 to display the effect information in the liquid crystal display device 21.

In the embodiment, the effect information is classified into (1) a type comprising the effect information representing a character relating (corresponding) to a figure and the effect information besides the character, such as "ready-to-win!" or "big win!" and (2) a type comprising the effect information representing a character not relating (corresponding) to a figure and the effect information besides the character, such as "ready-to-win!" or "big win!". The respective effect information is memorized as the effect information image data in an image data ROM 305*b*.

It is enough that the effect information includes the effect information representing at least a character. In other words, it is not necessarily required that the effect information besides the character should be included.

The program ROM 302 memorizes the display effect data including the special symbol display pattern data and the effect information display pattern data.

Specifically, the display effect data is memorized as a display effect data table 100 consisting of registration items 110, 120, 130 of the variable display pattern command, the identification information and the display effect data, as shown in FIG. 10.

In the registration item 110 of the variable display pattern command, it is memorized the command information representing a variable display pattern command preset so that the main CPU 201 can generate it. For example, in the registration item 110, 1 and 2 represent "command information=1" and "command information=2", respectively.

In the registration item 120 of the identification information, it is memorized figure IDs (identification information) each of which is provided to the plural detachable figures (decoration members) having types different from each other. The figure ID is the same identification information which is provided to the same type of decoration member (figure), as described above. For example, in the registration item 120, "nothing" represents that there is no registration of the figure ID, and "001" and "002" represent "figure ID=001" and "figure ID=002", respectively.

In the registration item 130 of the display effect data, it is memorized the display effect data corresponding to the variable display pattern command, i.e., the display effect data including the special symbol display pattern data and the effect information display pattern data. In the embodiment, in the registration item 130, it is memorized the display effect data representing the data for indicating (instructing) the special symbol display pattern (more specifically, special symbol) and the effect information display pattern (more specifically, effect information image), respectively.

In the mean time, in the registration item 130, the display effect data 11, the display effect data 21 and the display effect data 31 correspond to the second effect data. In this case, the effect information is the type (2) of the effect information.

In addition, in the registration item 130, the display effect data 11A, the display effect data 21A and the display effect data 31A correspond to the first effect data. In this case, the effect information is the type (1) of the effect information.

In addition, in the registration item 130, the display effect data 11B, the display effect data 21B and the display effect data 31B correspond to the second effect data. In this case, the effect information is the type (2) of the effect information.

In the embodiment, as described above, the second effect data (second effect data not including the effect information related to the decoration member) is classified into the data (for example, display effect data 11) corresponding to a case where "nothing" is registered in the registration item 120 (there is no registration of the figure ID) and the data (for example, display effect data 11B) corresponding to a case where the identification information (figure ID) is registered in the registration item 120.

Figure 11A:
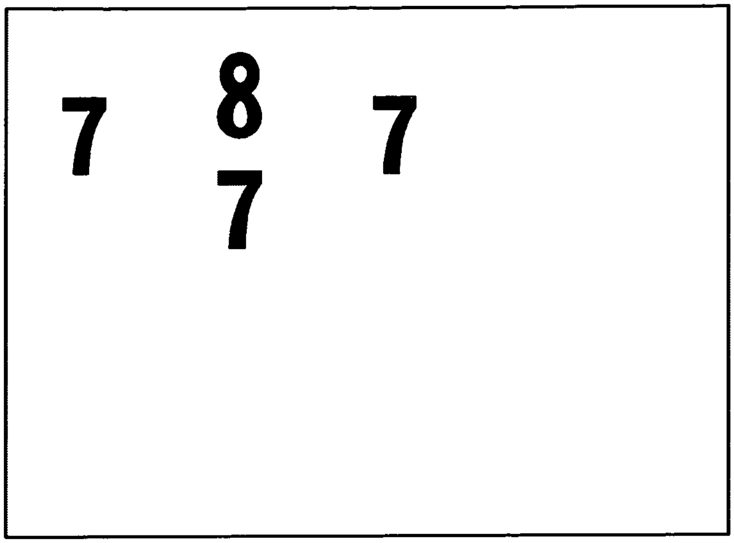
FIG. 11A is a view showing an example of a special symbol image data corresponding to the special image according to an embodiment of the invention.
Figure 11B:
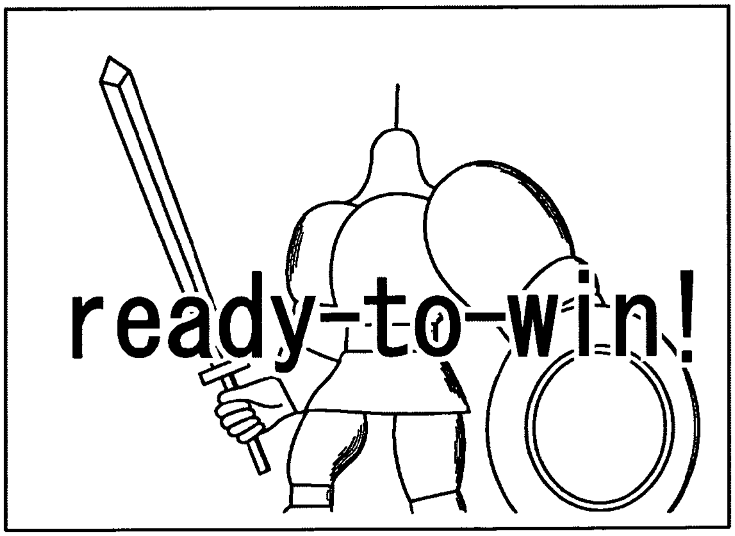
FIG. 11B is a view showing an example of an effect information image data corresponding to the effect information including a character related to a figure according to an embodiment of the invention.
Figure 11C:
FIG. 11C is a view showing an example of an effect information image data corresponding to the effect information including a character not related to a figure according to an embodiment of the invention.

Herein, an example of the display effect image data corresponding to the display effect data is shown in FIGS. 11A, 11B, and 11C. FIG. 11A shows the special symbol image data corresponding to the special image, FIG. 11B shows the effect information image data corresponding to the effect information including a character related to a figure, and FIG. 11C shows the effect information image data corresponding to the effect information including a character not related to a figure. These special symbol image data and effect information image data are memorized in the image data ROM 305*b* of the image control circuit 305.

The sub-CPU 301 carries out the function of the effect data selecting means to select one display effect data, based on the variable display pattern command from the main CPU 201 or this command, the figure ID from the IC chip reader 52 and the display effect data table 100.

For example, when the sub-CPU 301 receives the variable display pattern command from the main CPU 201, for example the variable display pattern command 1 (variable display pattern command information=1) only, it retrieves the display effect data table 100 and selects the display effect data 11 corresponding to the variable display pattern command 1 and the identification information "nothing".

In this case, the selected display effect data includes the special symbol display pattern data corresponding to the special symbol image data, as shown in FIG. 11A and the effect information display pattern data corresponding to the effect information image data, as shown in FIG. 11C.

In addition, when the sub-CPU 301 receives the variable display pattern command, for example the variable display pattern command 1 from the main CPU 201 and the figure ID, for example figure ID="001" from the IC chip reader 52, it retrieves the display effect data table 100 and selects the display effect data corresponding to the variable display pattern command 1.

In this case, the sub-CPU 301 selects the display effect data 11 corresponding to the variable display pattern command 1 and the identification information "nothing" or the display effect data 11A or display effect data 11B corresponding to the variable display pattern command 1 and the identification information "001". In the embodiment, the sub-CPU 301 may select the display effect data 11 corresponding to the identification information "nothing" (there is no registration of the figure ID), even when it receives the figure ID (i.e., the FIG. 40 is mounted to the base 50).

In addition, in the embodiment, as described above with regard to the effect data selecting means, the sub-CPU 301 selects the display effect data 11A corresponding to the first effect data in a high probability, as compared to the display effect data 11 or display effect data 11B corresponding to the second effect data.

In this case, the selected display effect data 11A includes the special symbol display pattern data corresponding to the special symbol image data, as shown in FIG. 11A and the effect information display pattern data corresponding to the effect information image data, as shown in FIG. 11B.

In addition, the selected display effect data 11 or display effect data 11B includes the special symbol display pattern data corresponding to the special symbol image data, as shown in FIG. 11A and the effect information display pattern data corresponding to the effect information image data, as shown in FIG. 11C.

In addition, the effect information display pattern included in the display effect data 11 may be different from the effect information display pattern included in the display effect data 11B. For example, the effect information display pattern data in the selected display effect data 11B uses the effect information display pattern data corresponding to the effect information image data including the character same as a case of "identification information=nothing" in the registration item 120. However, the invention is not limited thereto. In other words, it may be used the effect information display pattern data corresponding to the effect information image data including a character not related to a figure.

Figure 9:
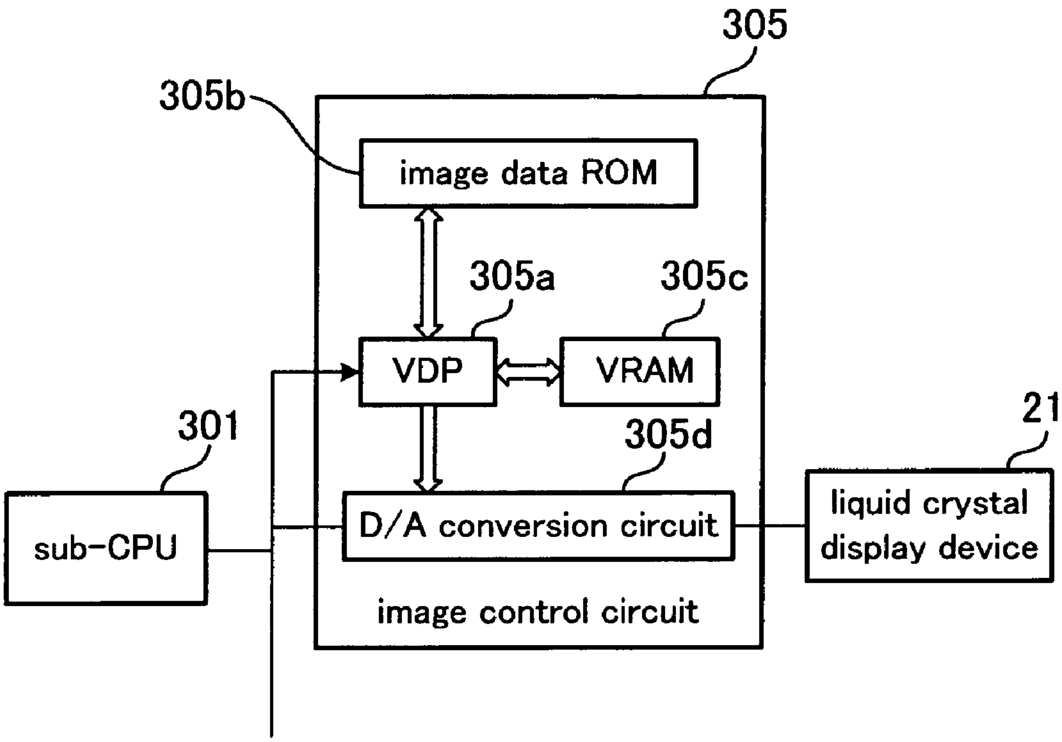
FIG. 9 is a block diagram showing a detailed structure of an image control circuit shown in FIG. 8.

In the mean time, the image control circuit 305 shown in FIG. 8 carries out the display such as the variable display of the special symbol in the liquid crystal display device 21 in accordance with the control of the sub-CPU 301 (control based on the control data which is set in a predetermined work area of the work RAM 303, correspondingly to the command received from the main control circuit 200), and comprises an image data ROM 305*b* memorizing the various image data, a VDP (Video Display Processor) 305*a* generating data for carrying out the display such as the variable display of the special symbol using the image data memorized in the image data ROM 305*b* under control of the sub-CPU 301 and a D/A conversion circuit 305*d* for converting the display image data generated by the VDP 305*b* into an analog signal, as shown in FIG. 9. In addition, the VDP 305*a* is connected to a VRAM 305*c* having two buffer areas provided thereto.

For example, the image control circuit 305 carries out an image display control process of variably displaying the special symbol and the effect information image (for example, character image) corresponding to the result of the big win determination with regard to the liquid crystal display device 21, based on the control of the sub-CPU 301. In other words, the image control circuit 305 carries out the instructions from the sub-CPU 301 transmitted every predetermined time period, so that the special symbol or effect information image corresponding to the variable display pattern is displayed in the liquid crystal display device 21, for example.

In addition, the image control circuit 305 and the liquid crystal display device constitute means for notifying whether or not there occurs a ready-to win effect in a corresponding game, a type of a ready-to-win effect occurring or a reliability of a big win occurrence, through the effect display mode at the time when the special symbol is variably displayed.

The VDP 305*a* carries out following processes, when generating the data for carrying out the display of the liquid crystal display device 21 based on the instructions transmitted from the sub-CPU 301 every predetermined time period (for example, 1/30 second). The VDP 305*a* reads out the predetermined image data from the image data ROM 305*b*, and develops the read data in the VRAM 305*c* while reading out the developed image data from the VRAM 305*c*. Specifically, the VDP 305*a* carries out the development process with regard to the one buffer area provided to the VRAM 305*c* and reads out the image data which has been already developed from the other buffer area. The VDP 305*a* changes the buffer area of the development process object and the buffer area of the reading object, based on the instruction of the sub-CPU 301. The VDP 305*a* scans and displays the read image data to the liquid crystal display device 21 through the D/A conversion circuit 305*d*.

In the mean time, in the embodiment, the VRAM is used as a memory device for developing the image data. However, the invention is not limited thereto and the other memory devices may be used. For example, a SDRAM capable of reading and writing the data at high speed may be used.

The image data ROM 305*b* memorizes the special symbol image data for variably displaying the special symbol, which is an identification image, in the display screen of the liquid crystal display device 21, the effect information image data for displaying the effect information image (effect information image including the character image) in the display screen of the liquid crystal display device 21, the demo effect image data for displaying a demonstration effect (hereinafter, referred to as "demo effect") and the game information image data for displaying the respective game information. The respective image data includes plural picture element data (data in a dot unit) which are required to display the respective image data in the display screen of the liquid crystal display device 21.

In the mean time, the special symbol image data and the effect information image data are respectively memorized in the different areas of the image data ROM 305*b*. It may be structured such that a plurality of image data ROMs are provided and the special symbol image data is memorized in an image data ROM different from the image data ROM which memorizes the effect information image data.

For example, the image data ROM 305*b* memorizes each of the special symbol image data and the effect information image data shown in FIGS. 11A, 11B, and 11C.

Again referring to FIG. 8, the sound control circuit 306 is connected to the speakers 8*a*, 8*b*. The sound control circuit 306 generates a sound signal, based on the control of the sub-CPU 301. The speakers 8*a*, 8*b* generate the sound, based on the sound signal inputted.

The lamp control circuit 307 is connected to the lamp LED 39*a*. The lamp control circuit 307 generates a signal, based on the control of the sub-CPU 301. The lamp LED 39*a* carries out the lighting-up display of the lamp or LED (for example, ordinary symbol memory LED or special symbol memory LED) provided to various places of the pachinko gaming machine 1, based on the signal inputted.

The speakers 8*a*, 8*b*, the lamp LED 39*a* and the liquid crystal display device 21 serve as the effect means for carrying out an effect on the basis of the effect data selected by the sub-CPU (effect data selecting means) 301.

The I/O port 308 is connected to an output of the photo sensor 59 and the IC chip reader 52 which are mounted to the base 50.

The output of the photo sensor 59 outputs a detection signal representing whether or not the FIG. 40 is mounted to the base 50. The detection signal is inputted to the sub-CPU 301 via the I/O port 308.

The IC chip reader 52 outputs the figure ID (figure ID of the FIG. 40 mounted to the base 50) read out in accordance with the request from the sub-CPU 301. Specifically, the IC chip reader 52 reads out the figure ID memorized in the IC chip 44 of the FIG. 40.

When the figure ID is inputted to the sub-CPU 301 via the I/O port 308, the sub-CPU 301 selects the effect data, which corresponds to the variable display pattern command received from the main CPU 201 via the command input port 304, from the memory contents of the display effect data table 100, based on the figure ID, the received variable display pattern command and the display effect data table 100, and delivers the selected effect data to the image control circuit 305 to carry out a control of an effect relating to the effect data.

In the mean time, the respective processes of the pachinko gaming machine 1 are controlled by the main control circuit 200 and the sub-control circuit 300. The main control circuit 200 may process the entire or part of the processes controlled by the sub-control circuit 300. Likewise, the sub-control circuit 300 may process the entire or part of the processes controlled by the main control circuit 200.

Figure 12A:
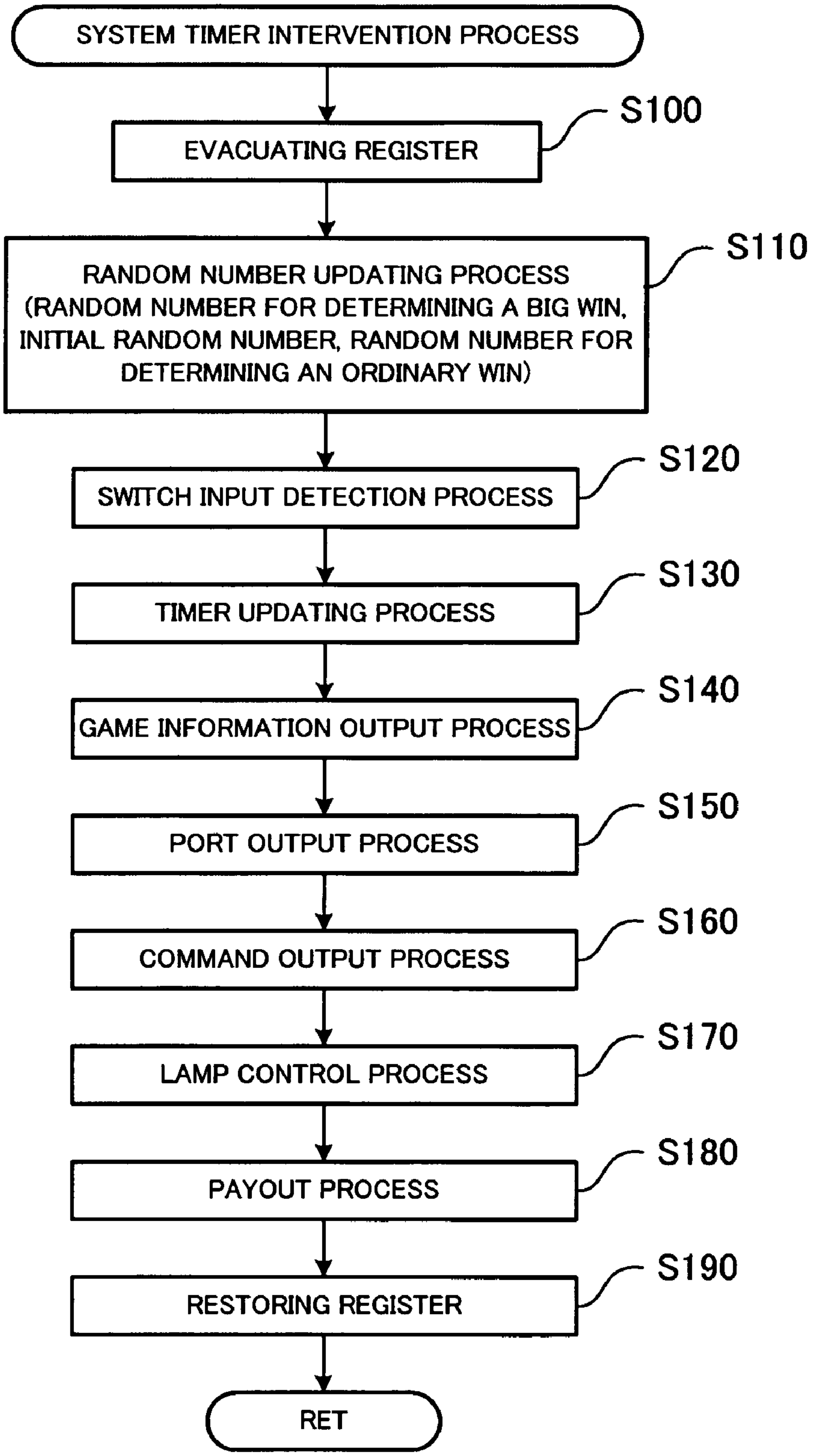
FIG. 12A is a flow chart showing a process operation of a main control circuit of a gaming machine according to an embodiment of the invention, and a system timer intervention process is shown.
Figure 12B:
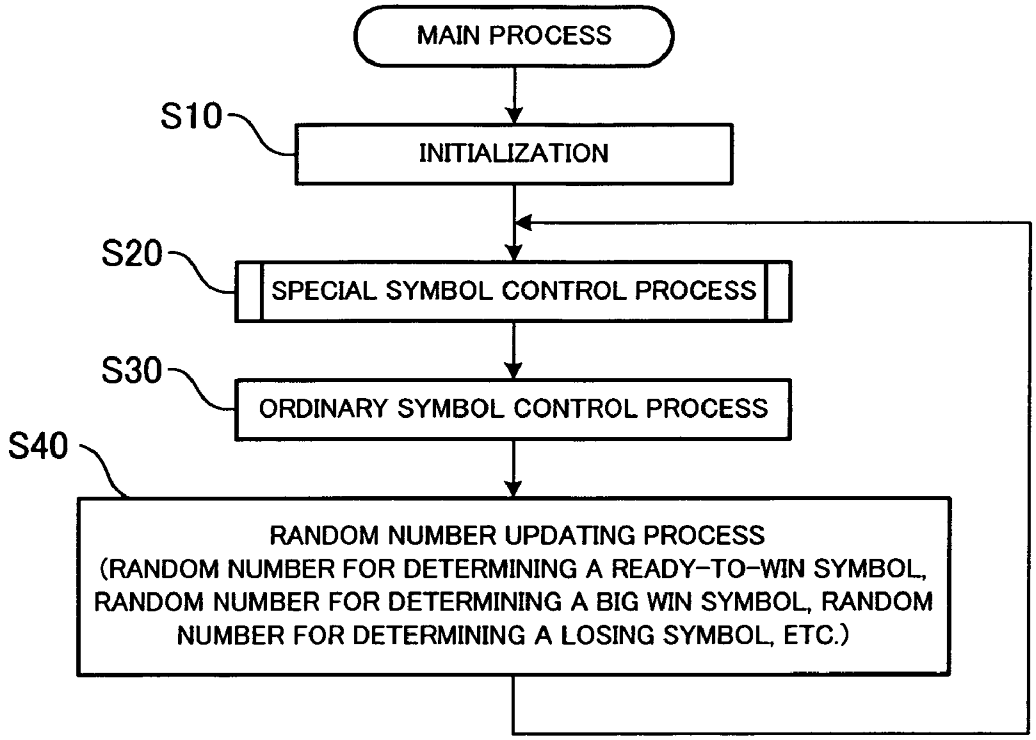
FIG. 12B is a flow chart showing a process operation of a main control circuit of a gaming machine according to an embodiment of the invention, and a main process is shown.

In the followings, it is described a process of the main control circuit 200 of the pachinko gaming machine 1, with reference to FIG. 12A, 12B.

In addition, FIG. 12A is a flow chart showing a system timer intervention process which is carried out to intervene in a main process in a predetermined period (for example, 2 msec), and FIG. 12B is a flow chart showing a main process of the pachinko gaming machine 1 according to an embodiment of the invention.

First, it is described a system timer intervention process, with reference to FIG. 12A.

In a step S100, the main CPU 201 evacuates the information stored in a register.

In a step S110, the main CPU 201 updates the random number value for determining a big win, the random number value for determining an ordinary win, the random number value for determining the number of times of maximum round and the like.

In a step S120, the main CPU 201 carries out a switch input detecting process. In the followings, it is specifically described the switch input detecting process.

The main CPU 201 detects the detection signals outputted from the start winning hole SW 19*a*, the normal winning hole SW 19Sb, the V count SW 19Sd, the count SW 19Se and the passage gate SW 19Sa, through the I/O port 205. The main CPU 201 having detected the signals carries out the following (1)~(5) processes, depending on the contents of the detection signals detected.

(1) When the main CPU 201 detects the detection signal from the count SW 19Se through the I/O port 205, it counts the number of gaming balls accepted in the big winning hole 15 during one time round in the big win gaming state and updates the big winning hole-winning counter. In the mean time, as described above, the one time round is a period from after the door of the big winning hole 15 is opened until a predetermined time period (for example, 29.5 seconds) elapses, or from after the door of the big winning hole 15 is opened until the predetermined number of gaming balls (for example, 10 balls) is accepted in the big winning hole 15.

(2) When the main CPU 201 detects the detection signal from the V count SW 19Sd through the I/O port 205, it detects that the gaming ball has passed to the big win area during one time round in the big win gaming state, at the same time, counts the number of gaming balls accepted in the big winning hole 15 and updates the big winning hole-winning counter.

(3) When the main CPU 201 detects the detection signal from the start winning hole SW 19*a* provided to the start winning holes 14, 17 through the I/O port 205, it checks the value of the winning memory counter. When the value is 4 or less, it samples a random number value for determining a big win, a random number value for determining a big win symbol and a random number value for determining the number of times of maximum round by the random number lottery and memorizes them in winning memory areas of the main RAM 203, as the winning memory.

In the mean time, when the value of the winning memory counter is 0, the special symbol is not variably displayed and the winning memory-number is 0. When the value of the winning memory counter is 1, the special symbol is variably displayed and the winning memory-number is 0. In addition, when the value of the winning memory counter is 5, the special symbol is variably displayed and it is displayed in the special symbol memory LED that the number of winning memory is 4.

(4) When the main CPU 201 detects the detection signal from the passage gate SW 19Sa provided to the passage gate 13 through the I/O port 205, it checks the value of the passing memory counter. When the value is 4 or less, it samples a random number value for determining an ordinary win by the random number lottery and memorizes it in a passing memory area of the main RAM 203, as the passing memory.

In addition, when it is under state that the ordinary symbol cannot be variably displayed in the ordinary symbol display area (for example, the symbol is variably displayed in the ordinary symbol display area, based on a result of the other ordinary win determination), the main CPU 201 outputs to the sub-control circuit 300 a control command to instruct the ordinary symbol display LED to display that there exists the passing memory, until it is possible to variably display the symbol in the ordinary symbol display area.

In the mean time, when the value of the passing memory counter is 0, the ordinary symbol is not variably displayed in the ordinary symbol display area and the passing memory-number is 0. When the value of the passing memory counter is 1, the ordinary symbol is variably displayed in the ordinary symbol display area and the passing memory-number is 0. In addition, when the value of the passing memory counter is 5, the ordinary symbol is variably displayed and it is displayed in the ordinary symbol memory LED that the passing memory-number is 4.

(5) When the main CPU 201 detects the detection signal from the passage gate SW 19Sa through the I/O port 205, it carries out the ordinary win determination, based on the random number value for determining an ordinary win sampled by the random number lottery and the ordinary win determining table, and outputs to the sub control circuit 300 a control command to variably display the symbol in the ordinary symbol display area on the basis of the result of the ordinary win determination.

In a step S130, the main CPU 201 updates the remaining variable display time of the ordinary symbol or special symbol variably displayed, the remaining display time of the effect information image displayed, the remaining open time of the start winning hole 17 or the big winning hole 15 under state that it is easy to accept the gaming ball, and the like.

In a step S140, the main CPU 201 outputs the game information, such as the number of gaming balls paid out as an award ball and the occurrence of the big win, to a hall computer which is equipped in a game arcade.

In a step S150, the main CPU 201 controls the driving of the solenoids, such as the movable member SOL 71S, the big winning hole SOL 72S, the seesaw SOL 73S and the like.

In a step S160, the main CPU 201 outputs a command to instruct a stop symbol of the special symbol, a variable display pattern command to instruct a special symbol display pattern of the special symbol and an effect information display pattern of the effect information (for example, character) and the other commands to the sub-control circuit 300.

In a step S170, the main CPU 201 outputs a control command to instruct the sub-control circuit 300 to display the winning memory-number of the start winning holes 14, 17, Which is memorized in the main RAM 203, in the predetermined area of the special symbol memory LED and outputs a control command to instruct the sub-control circuit 300 to display an error, such as the exhaustion of the gaming ball and the full of the lower tray, in the predetermined lamp.

In a step S180, the main CPU 201 outputs a control command such as a payout command signal to instruct the payout control circuit 70*a* to pay out the predetermined number of gaming balls as an award ball in accordance with the type (for example, normal winning hole 12 or big winning hole 15) of the winning hole in which the gaming ball is accepted.

In a step S190, the main CPU 201 restores the information evacuated in the step S100 to the register.

In the followings, it is described a main process of the main control circuit 200, with reference to FIG. 12B.

In a step S10, the main CPU 201 restores or initializes the various settings of the pachinko gaming machine 1 to the setting contents at the time when the previous power is formerly cut off.

In a step S20, the main CPU 201 carries out a special symbol control process (see FIG. 13) which will be described later.

In a step S30, the main CPU 201 carries out the respective processes regarding the ordinary symbol. Specifically, the main CPU 201 carries out the ordinary win determination, based on the random number for determining an ordinary win which is sampled on condition that the gaming ball passes to the passage gate 13. Then, the main CPU generates and sets a command to instruct the variable display of the ordinary symbol in the ordinary symbol display area, based on a result of the ordinary win determination. After that, the main CPU 201 subtracts "1" from the passing memory counter and shifts the data memorized in the respective passing symbol memory areas ("1"~"4") to the ordinary symbol memory areas ("0"~"3"), respectively.

In the mean time, the ordinary symbol memory area is a passing memory area which is allotted to the main RAM 203 and in which the random number for determining an ordinary win sampled on condition that the gaming ball passes to the passage gate 13 is sequentially memorized from the passing symbol memory area "0". In addition, the random number for determining an ordinary win and the like memorized in the ordinary symbol memory areas ("1"~"4") correspond to the passing memory, and the random number for determining an ordinary win, etc. memorized in the ordinary symbol memory area "0", are used for the ordinary win determination.

In a step S40, the main CPU 201 updates the values of the random number for determining a ready-to-win symbol, the random number for determining a big win symbol, the random number for determining a losing symbol, and the like.

In the mean time, the main CPU 201 repetitively carries out the processes from the step S20 to the step S40.

Figure 13:
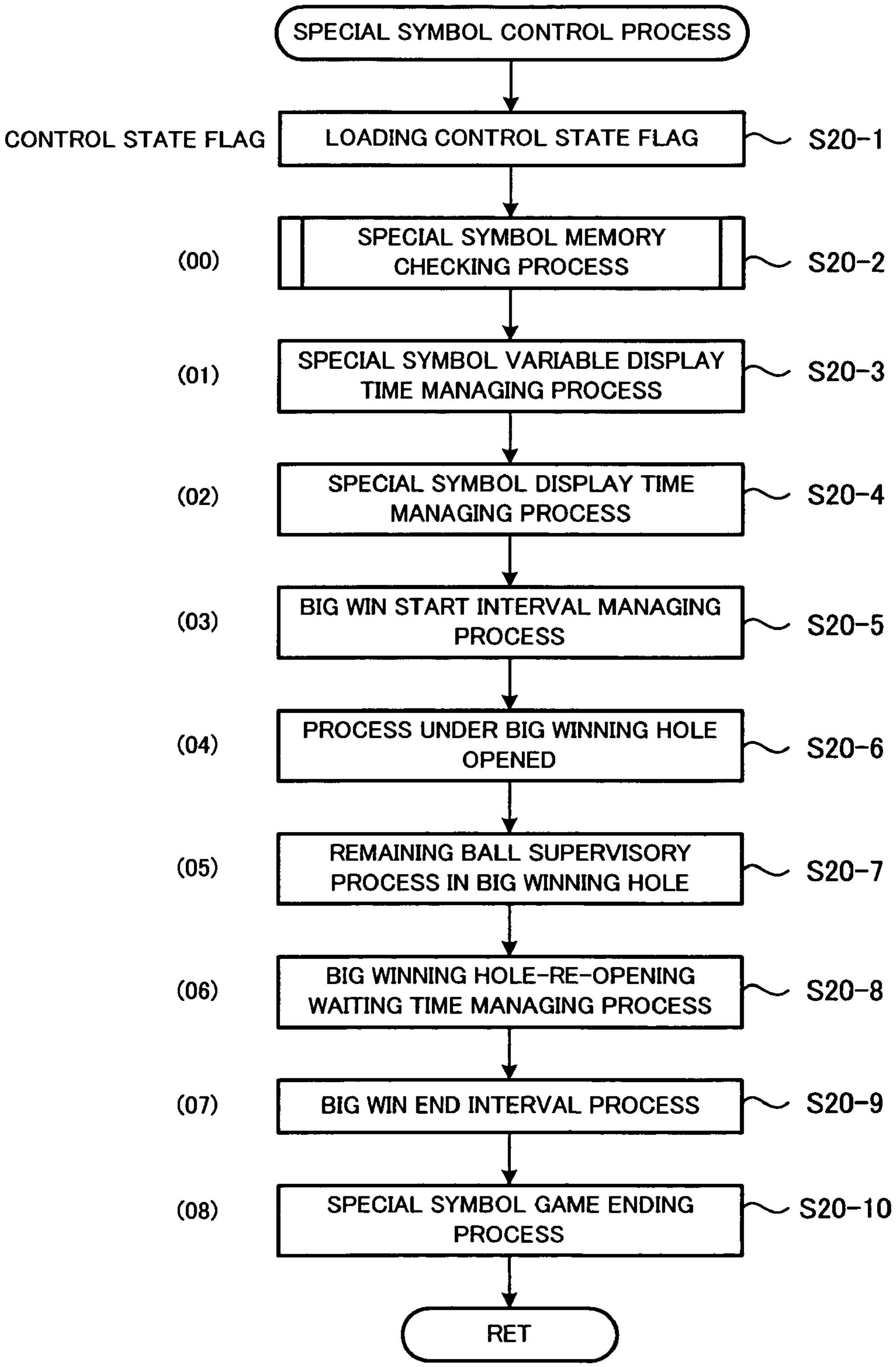
FIG. 13 is a flow chart showing a special symbol control process operation according to an embodiment of the invention.

In the followings, it is described the special symbol control process in the step S20, with reference to FIG. 13. In the mean time, FIG. 13 is a flow chart showing a special symbol control process.

In a step S20-1, the main CPU 201 carries out a process of loading a control state flag. In the mean time, the control state flag is a flag representing a gaming state of the special symbol game. The main CPU 201 determines whether or not to carry out each process in steps S20-2 to S20-10, based on the control state flag.

In a step S20-2, the main CPU 201 carries out a special symbol memory checking process (see FIG. 14) which will be specifically described. Herein, it is mainly carried out a big win determining process. Then, it is carried out a determination of a symbol and a determination of a variable display pattern in accordance with a result of the determination.

In a step S20-3, in case that the control state flag is a value (01) representing a special symbol variable display time management and a value of the waiting time timer having the variable display time set thereto is "0", the main CPU 201 sets a value (02) representing a special symbol display time managing process to the control state flag and sets the waiting time after a decision (for example, 1 second) to the waiting time timer.

In a step S20-4, in case that the control state flag is a value (02) representing a special symbol display time managing process, a value of the waiting time timer having the waiting time after a decision set thereto is "0" and a result of the big win determining process in the special symbol checking process of the step S20-2 causes the gaming state to be shifted to the big win gaming state, the main CPU 201 sets a value (03) representing a big win start interval managing process to the control state flag and sets a time period (for example, 10 seconds) corresponding to a big win start interval to the waiting time timer. Herein, the main CPU 201 sets a value "2" representing the big win gaming state to a gaming state check flag. Then, it generates and sets a big win game start command. In the mean time, the big win gaming state start command includes the information of the gaming state check flag.

In addition, in case that a result of the big win determining process in the special symbol checking process does not cause the gaming state to be shifted to the big win gaming state (i.e., in case of the losing), the main CPU 201 sets a value (08) representing a special symbol game ending process to the control state flag.

Herein, when the value (08) representing a special symbol game ending process is set to the control state flag, the main CPU 201 determines whether or not it is fulfilled a predetermined probability variation condition. As a result of the determination, when it is determined that the predetermined probability variation condition is fulfilled, the main CPU sets a value (77) representing a check on probability variation to a high probability flag and sets a value "1" representing the special gaming state to the gaming state check flag.

In the mean time, when it is determined that the predetermined probability variation condition is not fulfilled, the main CPU sets a value (00) representing a usual check to the high probability flag and sets the value "0" representing the base gaming state to the gaming state check flag.

In the mean time, the high probability flag is a flag for determining whether or not a gaming state is the special gaming state. When the high probability flag is a value (77) representing the check on probability variation, it is meant that a gaming state is the special gaming state. When the high probability flag is a value (00) representing the usual check, it is meant that a gaming state is not the special gaming state.

In a step S20-5, in case that the control state flag is the value (03) representing a big win start interval managing process and the value of the waiting time timer having the time period corresponding to the big win start interval set thereto is "0", the main CPU 201 controls the big winning hole SOL 72S to open the door of the big winning hole 15. The main CPU 201 sets a value (04) representing a process under big winning hole opened to the control state flag and sets the upper limit of open time (for example, 30 seconds) to a big winning hole-open time timer.

In a step S20-6, in case that the control state flag is the value (04) representing a process under big winning hole opened, the main CPU 201 checks whether it is fulfilled a condition that the value of the big winning hole-open time timer having the upper limit of open time set thereto is "0" or a condition that ten or more gaming balls are accepted in the big winning hole 15. Herein, when one of the two conditions is satisfied, the main CPU 201 controls the big winning hole SOL 72S to close the door of the big winning hole 15, sets a value (05) representing a remaining ball supervisory process in a big winning hole to the control state flag and sets a time period for supervising a remaining ball in a big winning hole (for example, 1 second) to the waiting time timer.

In a step S20-7, in case that the control state flag is the value (05) representing a remaining hole supervisory process in a big winning hole and the value of the waiting time timer, to which the time period for supervising a remaining hole in a big winning hole is set, is "0", the main CPU 201 checks whether it is satisfied a condition that a gaming ball has not passed to the big win area of the big winning hole 15 or a condition that the counter for counting the number of cases where a big winning hole is opened is "15" or more (i.e., final round). In the mean time, the counter for counting the number of cases where a big winning hole is opened is provided to count the number of rounds in the big win gaming state.

In addition, when one of the two conditions is satisfied in the step S20-7, the main CPU 201 sets a value (07) representing a big win end interval process to the control state flag and sets a time period corresponding to the big win end interval to the waiting time timer. In addition, when any of the conditions is not fulfilled in the step S20-7, the main CPU 66 sets a value (06) representing a big winning hole-re-opening waiting time managing process to the control state flag and sets a time period corresponding to the interval between the rounds to the waiting time timer.

In a step S20-8, in case that the control state flag is the value (06) representing a big winning hole-re-opening waiting time managing process and the value of the waiting time timer, to which the time period corresponding to the interval between the rounds is set, is "0", the main CPU 201 adds "1" to the counter for counting the number of cases where a big winning hole is opened. In addition, the main CPU 201 sets the value (04) representing a process under big winning hole opened to the control state flag and sets the upper limit of open time (for example, 30 seconds) to the big winning hole-open time timer.

In a step S20-9, in case that the control state flag is the value (07) representing a big win end interval process and the value of the waiting time timer, to which the time period corresponding to the big win end interval is set, is "0", the main CPU 201 sets a value (08) representing a special symbol game ending process to the control state flag. In addition, the main CPU 201 generates and sets a big win game ending command. In the mean time, the special game ending command includes the information of the gaming state check flag.

In addition, the main CPU 201 checks whether or not the stop symbol representing a big win is a specific symbol such as "7" or "3", i.e., whether or not a predetermined probability variation condition is fulfilled.

Herein, when it is checked that a predetermined probability variation condition is fulfilled, the main CPU 301 sets the value (77) representing the check on probability variation to the high probability flag and sets the value "1" representing the special gaming state to the gaming state check flag. In the mean time, when it is checked that a predetermined probability variation condition is not fulfilled, the main CPU 301 sets the value (00) representing the usual check to the high probability flag and sets the value "0" representing the base gaming state to the gaming state check flag.

In a step S20-10, in case that the control state flag is a value (08) representing a special symbol game ending process, the main CPU 201 subtracts "1" from the winning memory counter. In addition, the main CPU 201 shifts the data memorized in the respective special symbol memory areas ("1"~"4") to the special symbol memory areas ("0"~"3"), respectively, and sets the value (00) representing the special symbol memory checking process to the control state flag.

In the mean time, the special symbol memory area is a winning memory area which is allotted to the main RAM 203 and in which the random number for determining a big win sampled on condition that a winning of the gaming ball is made in the start winning holes 14, 17 is sequentially memorized from the special symbol memory area "0". In addition, the random number for determining a big win and the like memorized in the special symbol memory areas ("1"~"4") correspond to the winning memory and the random number for determining a big win, etc. memorized in the special symbol memory area "0" are used for the big win determination in a step S20-2-5.

Figure 14:
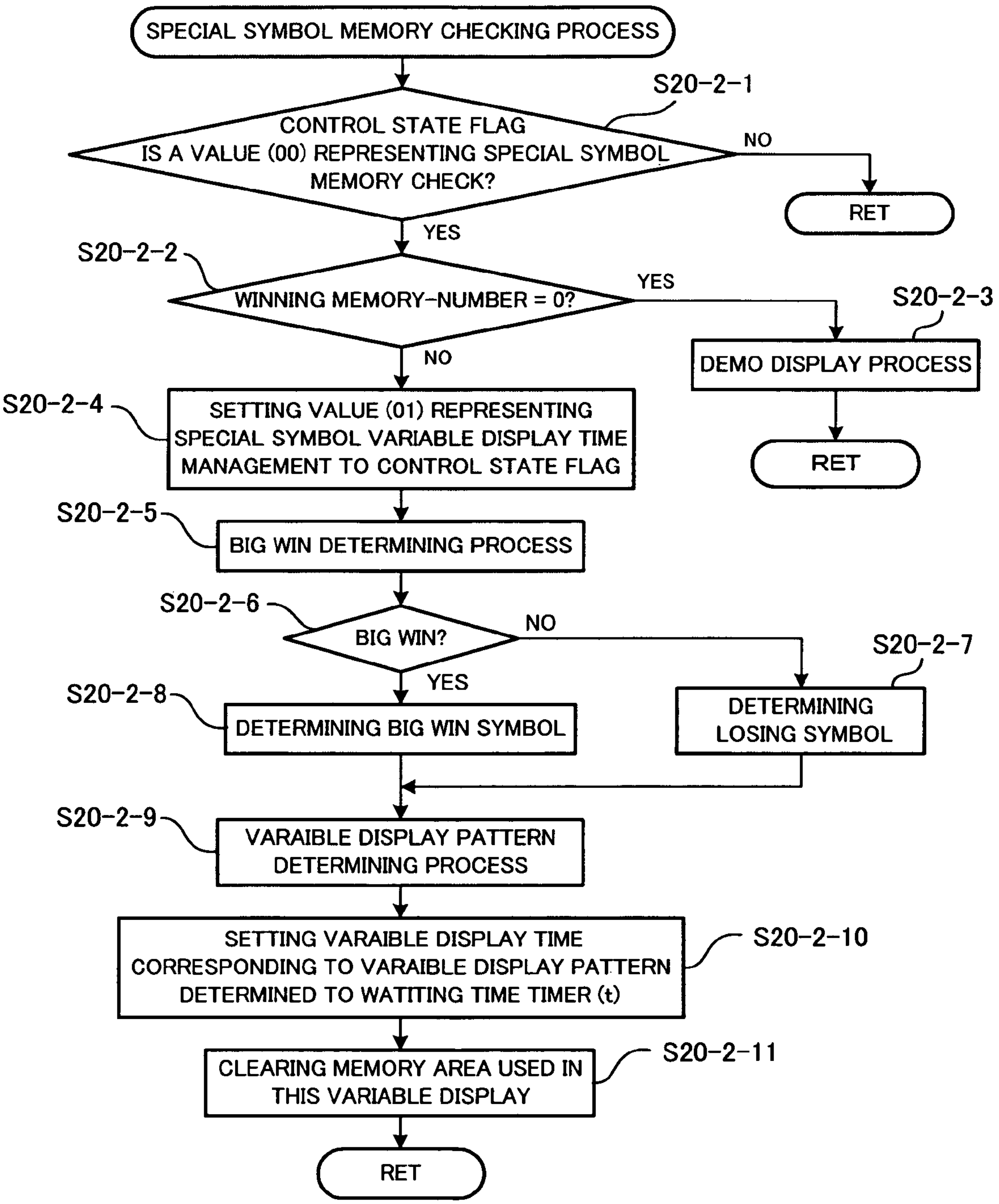
FIG. 14 is flow chart showing a special symbol memory checking process operation according to an embodiment of the invention.

In the followings, it is described the special symbol memory checking process in the step S20-2, with reference to FIG. 14. In the mean time, FIG. 14 is a flow chart showing a special symbol memory checking process.

In a step S20-2-1, the main CPU 201 checks whether the control state flag is the value (00) representing the special symbol memory check. As a result of the check, when it is determined that the control state flag is the value (00) representing the special symbol memory check, the main CPU 201 proceeds to a step S20-2-2. In the mean time, when it is determined that the control state flag is not the value (00) representing the special symbol memory check, the main CPU 201 ends the special symbol memory checking process.

In a step S20-2-2, the main CPU 201 checks whether or not the winning memory-number is "0". When it is determined that the winning memory-number is "0", the main CPU 201 proceeds to a step S20-2-3, otherwise proceeds to a step S20-24.

In a step S20-2-3, the main CPU 201 sets a value "3" representing a customer-standing by state to the gaming state check flag. Then, the main CPU generates and sets a demo effect command to instruct the display of the demo effect image to be executed. In the mean time, the demo effect command includes the information of the gaming state check flag. In addition, the demo effect command is generated when the gaming state is the customer-standing by state (the state that the variable display of the special symbol is not carried out, it is not the big win gaming state and there is no winning memory).

In a step S20-2-4, the main CPU 201 sets the value (01) representing a special symbol variable display time management to the control state flag.

In a step S20-2-5, the main CPU 201 carries out a big win determination, based on the random number value for determining a big win included in the winning memory.

In a step S20-2-6, the main CPU 201 checks whether or not the result of the big win determination causes the gaming state to be shifted to the big win gaming state (i.e., whether it is made a big win). As a result, when it is determined that the result of the big win determination causes the gaming state to be shifted to the big win gaming state, the main CPU 201 proceeds to a step S20-2-8. In the mean time, when it is determined that the result of the big win determination does not cause the gaming state to be shifted to the big win gaming state, the main CPU 201 proceeds to a step S20-2-7.

In a step S20-2-7, the main CPU 201 determines a stop symbol representing the losing, based on a predetermined random number value.

Specifically, the main CPU 201 determines whether or not to carry out a ready-to-win (ready-to-win variable display) in the variable display of the special symbol, based on a random number value sampled from the random numbers for determining a ready-to-win. As a result of the determination, when it is determined that a ready-to-win (ready-to-win variable display) is carried out in the variable display of the special symbol, the main CPU determines the "left" and "right" symbols, based on the random number value sampled from the random numbers for determining a ready-to-win, and determines the "center" symbol, based on the random number value sampled from the random numbers for determining a center losing symbol.

In the mean time, the main CPU 201 having determined not to carry out the ready-to-win in the variable display of the special symbol determines the "left", "center" and "right" symbols, based on the random number values sampled from the random numbers for determining a center losing symbol corresponding to the "left", "center" and "right". Then, based on the determination, the main CPU generates and sets a stop symbol command. In the mean time, the stop symbol command includes the information of the gaming state check flag.

In a step S20-2-8, the main CPU 201 determines the stop symbols ("left", "center" and "right") representing the big win, based on the random number value for determining a big win symbol included in the winning memory. Then, based on the determination, the main CPU generates and sets the stop symbol command. In the mean time, the stop symbol command includes the information of the gaming state check flag.

In a step S20-2-9, the main CPU 201 carries out a process of determining a variable display pattern of the special symbol. Specifically, the main CPU 201 samples one of the random numbers which are generated in a range of 0 to 99 by the random number generator. Then, the main CPU 201 compares the sampled random number value with the variable display pattern selecting table shown in FIG. 15 to determine a variable display pattern of the special symbol. Then, based on the determination, the main CPU generates and sets a variable display pattern command.

For example, in case that a result of the big win determination does not cause the gaming state to be shifted to the big win gaming state and it is not carried out the ready-to-win in the variable display of the special symbol, the main CPU 201 determines a "usual variation" as the variable display pattern of the special symbol and at the same time generates and sets a variable display pattern command, based on the determination. In the mean time, the variable display pattern command includes the information of the gaming state check flag.

In addition, in case that a result of the big win determination does not cause the gaming state to be shifted to the big win gaming state and the random number value sampled when it is carried out the ready-to-win in the variable display of the special symbol is within a range of 0 to 69, the main CPU 201 determines a "normal ready-to-win" as the variable display pattern of the special symbol. In the mean time, in case that the sampled random number value is within a range of 70 to 99, it determines a "super ready-to-win" as the variable display pattern of the special symbol.

Further, in case that a result of the big win determination causes the gaming state to be shifted to the big win gaming state, when the sampled random number value is within a range of 0 to 39, the main CPU 201 determines a "normal ready-to-win" as the variable display pattern of the special symbol. When the sampled random number value is within a range of 40 to 94, the main CPU 201 determines a "super ready-to-win" as the variable display pattern of the special symbol. In addition, when the sampled random number value is within a range of 95 to 99, the main CPU 201 determines an "entire rotation" as the variable display pattern of the special symbol. Then, the main CPU generates and sets a variable display pattern command, based on the corresponding determination. In the mean time, the variable display pattern command includes the information of the gaming state check flag.

In a step S20-2-10, the main CPU 201 sets the variable display time corresponding to the variable display patterns determined in the step S20-2-9 to the waiting time timer.

In the mean time, the variable display of the special symbol is carried out during the variable display time determined in the step S20-2-10, based on the variable display pattern determined in the step S20-2-9. When the variable display time is over, the special symbol being variably displayed is stopped under state that the symbol depending on the stop symbol command is displayed.

In a step S20-2-11, the main CPU 201 erases the random number value and the like, which are used in this special symbol memory checking process, from the predetermined memory areas.

In the mean time, the main CPU 201 carries out a process of determining a display pattern (effect information display pattern) of the effect information image through a lottery, in addition to the respective processes of the special symbol or ordinary symbol.

Specifically, the main CPU 201 samples one of the random numbers which are generated in a range of 0 to 1999 by the random number generator. Then, the main CPU 201 compares the sampled random number value with an effect information image display pattern determining table preset and determines a display pattern of the effect information image. Then, the main CPU enables the effect image display pattern data representing the effect image display pattern to be included in the variable display pattern command.

In other words, the variable display pattern command includes the special symbol display pattern data representing the special symbol display pattern, the effect image display pattern data representing the effect image display pattern, etc.

Figure 16:
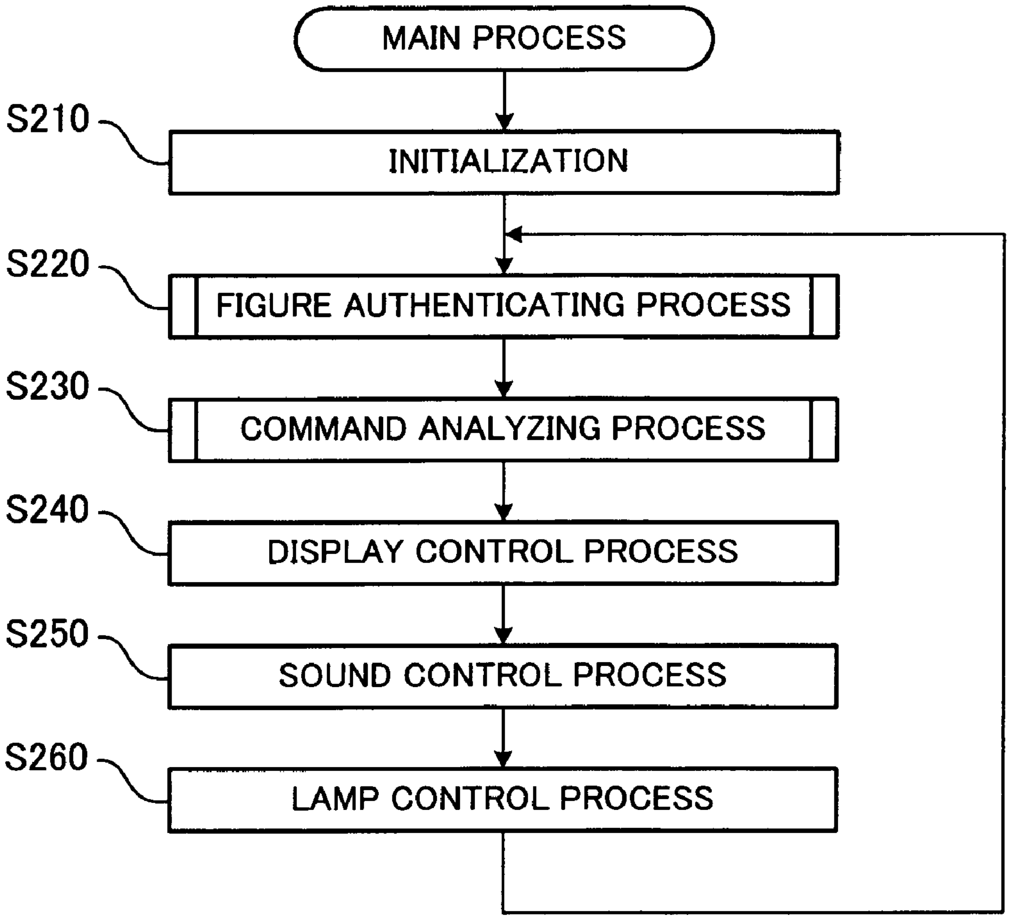
FIG. 16 is a flow chart showing a main process of a sub-control circuit of a gaming machine according to an embodiment of the invention.

In the followings, it is described a main process of the sub-control circuit 300 and a command receiving intervention process which is carried out to intervene in the main process when a command is received from the main control circuit 200. FIG. 16 is a flow chart showing the main process and FIG. 17 is a flow chart showing a command receiving intervention process.

Figure 17:
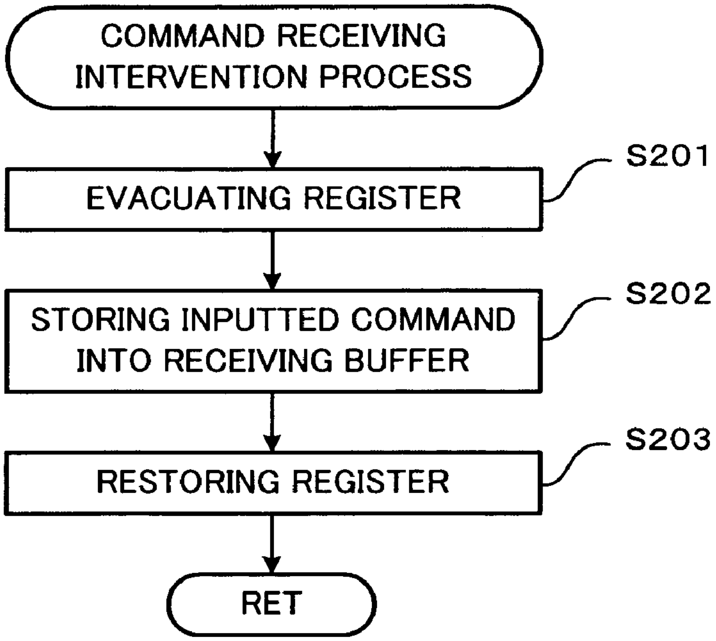
FIG. 17 is a flow chart showing a command receiving intervention process according to an embodiment of the invention.

First, it is described a command receiving intervention process with reference to FIG. 17. The command receiving intervention is adapted to occur whenever the sub-control circuit 300 receives a command from the main control circuit 200.

In a step S201, the sub-CPU 301 evacuates the information stored in the register so as to interrupt a process (main process) being currently carried out.

In a step S202, the sub-CPU 301 stores the command (for example, variable display pattern command) received from the main control circuit 200 via the command input port 304 in the receiving buffer area of the work RAM 303.

In a step S203, the sub-CPU 301 restores the information evacuated in the step S201 to the register. Thereby, the process interrupted can be resumed.

In the followings, it is described a main process of the sub-control circuit 300 with reference to FIG. 16.

In steps S210~S230, the sub-CPU 301 carries out an initialization process of initializing the various settings, then a figure authenticating process and a command analyzing process.

Figure 18:
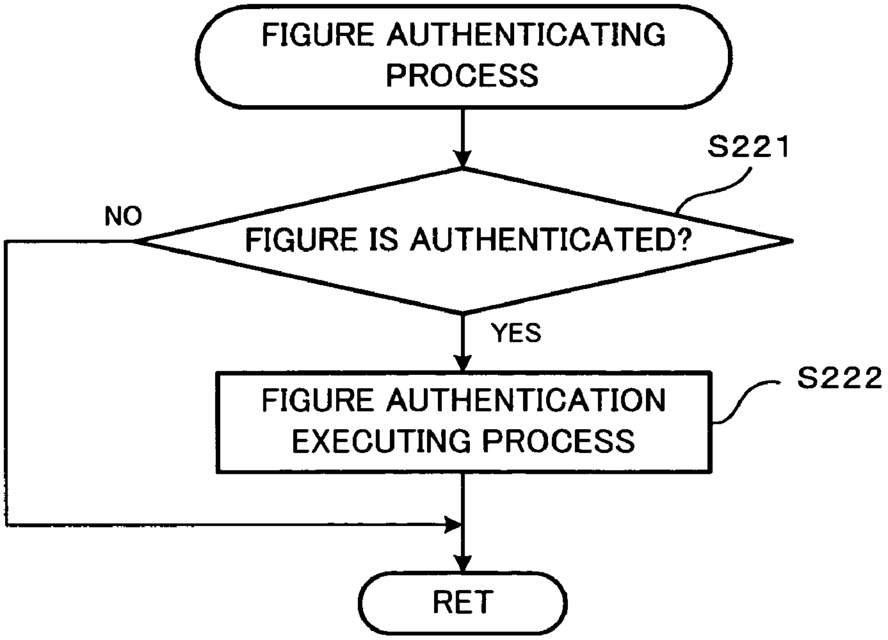
FIG. 18 is a flow chart showing a figure authenticating process according to an embodiment of the invention.

Herein, it is described the figure authenticating process in a step S220 with reference to FIG. 18. FIG. 18 is a flow chart showing the figure authenticating process.

In a step S221, the sub-CPU 301 determines whether or not a figure authentication is made (whether or not the FIG. 40 is mounted to the base 50), based on a detection signal from the output of the photo sensor 59, which is received via the I/O port 308.

When it is determined in the step S221 that a figure is authenticated because the detection signal is a signal representing that the FIG. 40 is mounted to the base 50, the sub-CPU 301 proceeds to a step S222. In the mean time, when it is determined that a figure is not authenticated because the detection signal is a signal representing that the FIG. 40 is not mounted to the base 50, the sub-CPU 301 ends the figure authenticating process.

In a step S222, the sub-CPU 301 carries out a figure authentication executing process. In the figure authentication executing process, the sub-CPU 301 initializes the contents (figure ID) of the ID memory area in the work RAM 303, requests the IC chip reader 52 to read out the figure ID through the I/O port 308, receives the figure ID from the IC chip reader 52 having read out the corresponding figure ID from the IC chip 44 in response to the request through the I/O port 308, and stores the figure ID in the ID memory area of the work RAM 303.

In the mean time, when it is determined that a figure authentication is not made, nothing is stored in the ID memory area.

In the embodiment, the initialization of the contents (figure ID) of the ID memory area is carried out in the figure authentication executing process. However, it may be carried out when a gamin is over, irrespective of whether a game is started with the FIG. 40 being mounted to the base 50.

Figure 19:
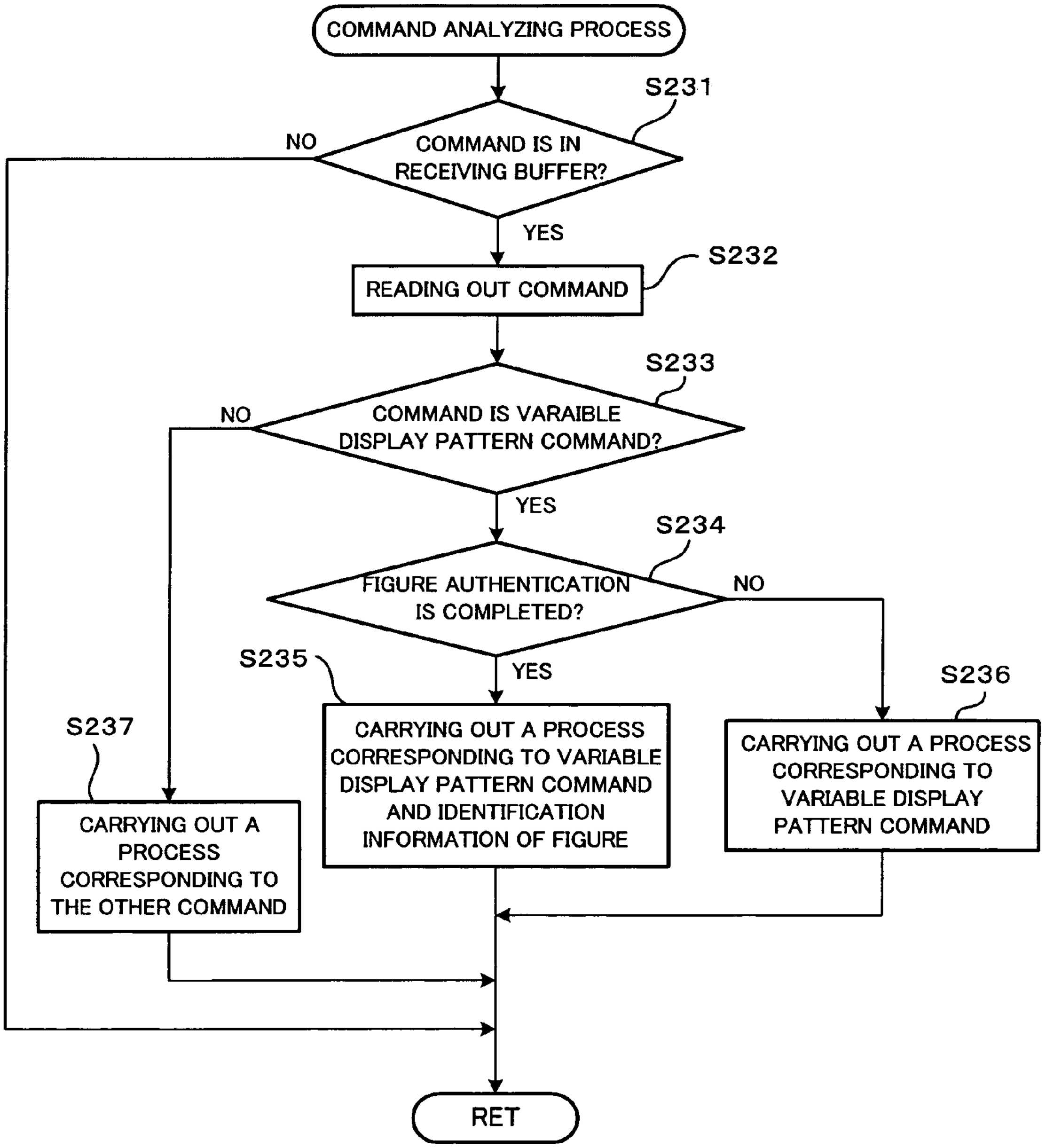
FIG. 19 is a flow chart showing a command analyzing process according to an embodiment of the invention.

In the followings, it is described a command analyzing process in a step S230, with reference to FIG. 19. FIG. 19 is a flow chart showing the command analyzing process.

In a step S231, the sub-CPU 301 determines whether a command is memorized in the receiving buffer. When it is determined that the command is memorized in the receiving buffer, the sub-CPU proceeds to a step S232. When it is determined that the command is not memorized in the receiving buffer, the sub-CPU ends the command analyzing process.

In a step S232, the sub-CPU 301 reads out the command from the receiving buffer.

In a step S233, the sub-CPU 301 determines whether the read command is the variable display pattern command. When it is determined that the read command is the variable display pattern command, the sub-CPU proceeds to a step S234. In the mean time, when it is determined that the read command is not the variable display pattern command (i.e., it is the other commands), the sub-CPU proceeds to a step S237.

In a step S234, the sub-CPU 301 determines whether a figure authentication is completed, based on whether the figure ID is memorized in the ID memory area of the work RAM 303. At this time, when the figure ID is memorized in the ID memory area, it is determined that the figure authentication is completed (i.e., the FIG. 40 is mounted to the base 50). When the figure ID is not memorized in the ID memory area, it is determined that the figure is not authenticated (i.e., the FIG. 40 is not mounted to the base 50).

When it is determined that the figure authentication is completed, the sub-CPU 302 proceeds to a step S235. In the mean time, when it is determined that the figure is not authenticated, the sub-CPU proceeds to a step S236.

In the step S235, the sub-CPU 301 carries out a predetermined process, based on the variable display pattern command and the figure ID of the FIG. 40.

In other words, the sub-CPU 301 interrelates the control data (control data corresponding to one pattern of the variable display patterns "00"~"05" shown in FIG. 15) corresponding to the special symbol display pattern data included in the received variable display pattern command, the control data corresponding to the effect information display pattern data included in the received variable display pattern command and the received figure ID and sets it in the work area of the work RAM 303.

In the step S236, the sub-CPU 301 carries out a predetermined process, based on the variable display pattern command.

In other words, the sub-CPU 301 sets the control data (control data corresponding to one pattern of the variable display patterns "00"~"05" shown in FIG. 15) corresponding to the special symbol display pattern data included in the received variable display pattern command in the work area of the work RAM 303.

In a step S237, the sub-CPU 301 carries out a predetermined process, based on the received command.

In other words, the sub-CPU 301 sets the control data, in which the received command corresponds to the command (for example, big win game start command to instruct a start of a big win gaming state) besides the variable display pattern command, in the work area of the work RAM 303.

Again referring to FIG. 16, in a step S240, the sub-CPU 301 carries out the image display control process.

First, it is described an image display control process when the sub-CPU 301 sets the control data corresponding to the special symbol display pattern data included in the variable display pattern command in the work area of the work RAM 303 in the step S235 (see FIG. 19).

In this case, the set control data corresponds to the variable display pattern command 1 (variable display pattern command information=1) of the registration item 110 in FIG. 10. In the mean time, in this case, it is ignored the control data which is set to the work area of the work RAM 303 and corresponds to the effect information display pattern included in the variable display pattern command.

In addition, the figure ID memorized in the ID memory area of the work RAM 303 is made to be figure ID="001" through the step S222 (see FIG. 18).

In this image display control process, the sub-CPU 301 selects the effect data (display effect data) corresponding to the variable display pattern command from the display effect data table 100.

In this case, the sub-CPU 301 selects the display effect data 11A corresponding to the first effect data in a high probability, as compared to the display effect data 11 or display effect data 11B corresponding to the second effect data.

(a) A Case where the Display Effect Data 11*a* is Selected in a High Probability The sub-CPU 301 selects the display effect data 11A in a high probability, as compared to a case where the display effect data 11B is selected.

The display effect data 11A selected includes the special symbol display pattern data corresponding to the special symbol image data as shown in FIG. 11A and the effect information display pattern data corresponding to the effect information image data as shown in FIG. 11B.

The sub-CPU 301 changes the data for instructing the VDP 305*a* to carry out the special symbol relating to the special symbol display pattern included in the special symbol display pattern data included in the display effect data 11A selected, as time goes by. When the VDP 305*a* carries out the instructions transmitted every predetermined time, the liquid crystal display device 21 variably displays the special symbol corresponding to the special symbol display pattern for the variable display time. When the variable display time is over, the special symbol displays and stops a symbol indicated by the stop symbol command.

In addition, the sub-CPU 301 changes the data for instructing the VDP 305*a* to carry out the effect display relating to the effect information display pattern included in the display effect data 11A selected, as time goes by. When the VDP 305*a* carries out the instructions transmitted every predetermined time, the liquid crystal display device 21 displays the effect information image corresponding to the effect information display pattern data for the display time of the effect information image (effect image).

Figure 20:
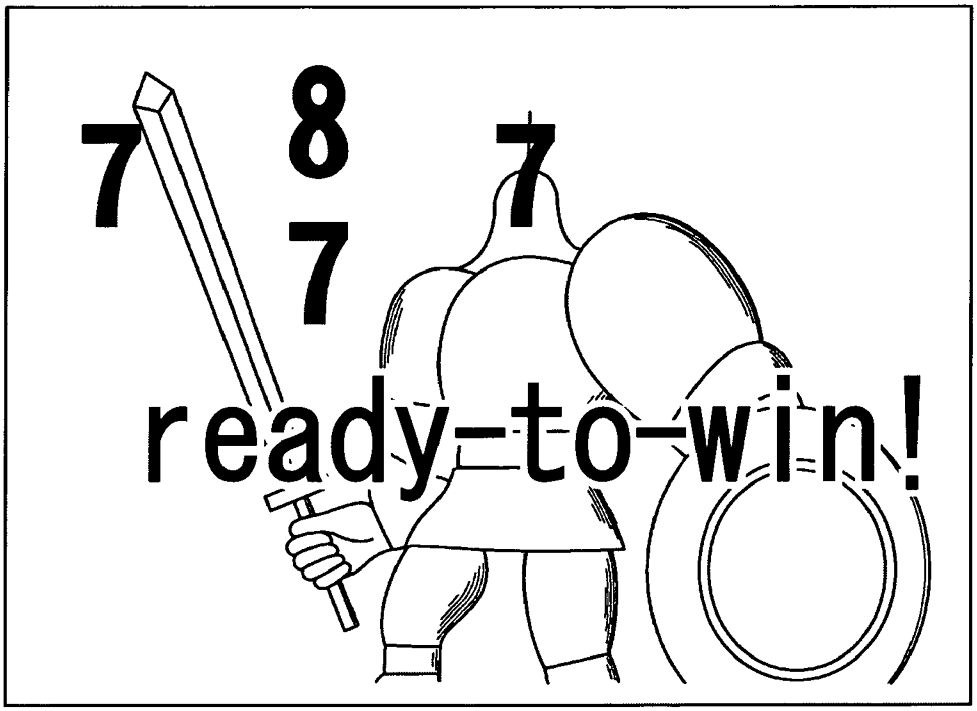
FIG. 20 is a view showing an example of an image which is displayed on an image display device, based on the effect image data including special symbol image data and character image data corresponding to a figure.

Accordingly, through the above processes, the special symbol image relating to the special symbol image data, as shown in FIG. 11A and the effect information image relating to the effect information image data, as shown in FIG. 11B are synthesized and the effect information image is thus displayed in the liquid crystal display device 21, as shown in FIG. 20. In the mean time, the effect information image shown in FIG. 20 shows a display mode of a super ready-to-win of when the figure authentication is made.

In other words, since the FIG. 40 is mounted to the base 50 and the figure authentication is made, it is displayed a display mode of a super ready-to-win of when the figure authentication is made, as shown in FIG. 20, in the liquid crystal display device 21, as the display effect information related to the corresponding FIG. 40, for example the effect information image including a character image related to the FIG. 40.

(b) A Case where the Display Effect Data 11 is Selected in a Low Probability The sub-CPU 301 selects the display effect data 11 in a low probability, as compared to the case where the display effect data 11A is selected.

The display effect data 11 selected in a low probability includes the special symbol display pattern data corresponding to the special symbol image data as shown in FIG. 11A and the effect information display pattern data corresponding to the effect information image data as shown in FIG. 11C.

The sub-CPU 301 changes the data for instructing the VDP 305*a* to carry out the special symbol relating to the special symbol display pattern included in the special symbol display pattern data included in the display effect data 11 selected, as time goes by. When the VDP 305*a* carries out the instructions transmitted every predetermined time, the liquid crystal display device 21 variably displays the special symbol corresponding to the special symbol display pattern for the variable display time. When the variable display time is over, the special symbol displays and stops a symbol indicated by the stop symbol command.

In addition, the sub-CPU 301 changes the data for instructing the VDP 305*a* to carry out the effect display relating to the effect information display pattern included in the display effect data 11 selected, as time goes by. When the VDP 305*a* carries out the instructions transmitted every predetermined time, the liquid crystal display device 21 displays the effect information image corresponding to the effect information display pattern data for the display time of the effect information image (effect image).

Figure 21:
FIG. 21 is a view showing an example of an image which is displayed on a liquid crystal display device, based on the effect image data not including character image data corresponding to special symbol image data.

Accordingly, through the above processes, the special symbol image relating to the special symbol image data, as shown in FIG. 11A and the effect information image relating to the effect information image data, as shown in FIG. 11C are synthesized and the effect information image is thus displayed in the liquid crystal display device 21, as shown in FIG. 21. In the mean time, the effect information image shown in FIG. 21 shows a display mode of a super ready-to-win of when there is no figure authentication.

In other words, even though the FIG. 40 is mounted to the base 50 and the figure authentication is made, it is displayed a display mode of a super ready-to-win of when there is no figure authentication, as shown in FIG. 21, in the liquid crystal display device 21, as the effect information image corresponding to a case where the figure authentication is not made (a case where there is no figure authentication), for example the effect information image including a character image not related to the FIG. 40.

(c) A Case where the Display Effect Data 11*b* is Selected in a Low Probability The sub-CPU 301 selects the display effect data 11B as a substitute for the display effect data 11 selected in a low probability, as compared to the case where the display effect data 11A is selected.

The display effect data 11B selected in a low probability includes the special symbol display pattern data corresponding to the special symbol image data as shown in FIG. 11A and the effect information display pattern data corresponding to the effect information image data as shown in FIG. 11C.

The sub-CPU 301 changes the data for instructing the VDP 305*a* to carry out the special symbol relating to the special symbol display pattern included in the special symbol display pattern data included in the display effect data 11B selected, as time goes by. When the VDP 305*a* carries out the instructions transmitted every predetermined time, the liquid crystal display device 21 variably displays the special symbol corresponding to the special symbol display pattern for the variable display time. When the variable display time is over, the special symbol displays and stops a symbol indicated by the stop symbol command.

In addition, the sub-CPU 301 changes the data for instructing the VDP 305*a* to carry out the effect display relating to the effect information display pattern included in the display effect data 11B selected, as time goes by. When the VDP 305*a* carries out the instructions transmitted every predetermined time, the liquid crystal display device 21 displays the effect information image corresponding to the effect information display pattern data for the display time of the effect information image (effect image).

Accordingly, through the above processes, the special symbol image relating to the special symbol image data, as shown in FIG. 11A and the effect information image relating to the effect information image data, as shown in FIG. 11C are synthesized and the effect information image is thus displayed in the liquid crystal display device 21, as shown in FIG. 21. In the mean time, the effect information image shown in FIG. 21 shows a display mode of a super ready-to-win of when there is no figure authentication.

In other words, even though the FIG. 40 is mounted to the base 50 and the figure authentication is made, it is not displayed the display effect information related to the corresponding FIG. 40 (for example, character image related to the FIG. 40). In other words, in the same manner as the case of the display effect data 11, it is displayed a display mode of a super ready-to-win of when there is no figure authentication, as shown in FIG. 21, in the liquid crystal display device 21, as the effect information image corresponding to a case where the FIG. 40 is not mounted to the base 50 and the figure authentication is not made (a case where there is no figure authentication), for example the effect information image including a character image not related to the FIG. 40.

In the followings, it is described an image display control process when the sub-CPU 301 sets the control data corresponding to the special symbol display pattern data included in the variable display pattern command in the work area of the work RAM 303 in the step S236 (see FIG. 19).

In this case, the set control data corresponds to the variable display pattern command 1 (variable display pattern command information=1) of the registration item 110 in FIG. 10.

The sub-CPU 301 selects the effect data corresponding to the variable display pattern command 1 and the identification information “nothing” from the display effect data table 100. In this case, the display effect data 11 is selected.

The display effect data 11 selected includes the special symbol display pattern data corresponding to the special symbol image data as shown in FIG. 11A and the effect information display pattern data corresponding to the effect information image data as shown in FIG. 11C.

The sub-CPU 301 changes the data for instructing the VDP 305*a* to carry out the special symbol relating to the special symbol display pattern included in the special symbol display pattern data included in the display effect data 11 selected, as time goes by. When the VDP 305*a* carries out the instructions transmitted every predetermined time, the liquid crystal display device 21 variably displays the special symbol corresponding to the special symbol display pattern for the variable display time. When the variable display time is over, the special symbol displays and stops a symbol indicated by the stop symbol command.

In addition, the sub-CPU 301 changes the data for instructing the VDP 305*a* to carry out the effect display relating to the effect information display pattern included in the display effect data 11 selected, as time goes by. When the VDP 305*a* carries out the instructions transmitted every predetermined time, the liquid crystal display device 21 displays the effect information image corresponding to the effect information display pattern data for the display time of the effect information image (effect image).

Accordingly, through the above processes, the special symbol image relating to the special symbol image data, as shown in FIG. 11A and the effect information image relating to the effect information image data, as shown in FIG. 11C are synthesized and the effect information image as shown in FIG. 20 is thus displayed in the liquid crystal display device 21.

In other words, since the FIG. 40 is not mounted to the base 50 and the figure authentication is not made, it is displayed a display mode of a super ready-to-win of when there is no figure authentication in the liquid crystal display device 21, as shown in FIG. 21, as the effect information image corresponding to a case where there is no figure authentication, for example the effect information image including a character image not related to the FIG. 40.

In a step S250, the sub-CPU 301 carries out a sound output control process.

Specifically, in the sound output control process, when the control data set in the step S237 (see FIG. 19) is the data corresponding to the sound output control, the sub-CPU 301 transmits the control data to the sound control circuit 306. The sound control circuit 306 outputs to the speaker 11*a* signal for notifying the player of a predetermined gaming state, based on the control data.

In a step S260, the sub-CPU 301 carries out a lamp LED lighting-up control process.

In addition, in the lamp LED lighting-up control process, when the control data set in the step S237 (see FIG. 19) is the data corresponding to the lamp or LED lighting-up control, the sub-CPU 301 transmits the control data to the lamp control circuit 307. The lamp control circuit 307 controls the lamp LED 39*a* to carry out the lighting-up and lights-out in accordance with a predetermined lighting-up and lights-out pattern, based on the control data.

In this main process, it is repetitively carried out the processes of the steps S220 to S260.

In the mean time, in the embodiment, when the detachable decoration member (figure) is mounted to the base, the effect information image is displayed in the liquid crystal display device, as an effect related to the effect data corresponding to the identification information provided to the decoration member. However, the invention is not limited thereto. For example, it may be carried out an effect by sound or effect by light (light emitting) as an effect related to the effect data corresponding to the identification information.

For example, with regard to the effect by sound, the program ROM 302 memorizes the plural effect data (effect data related to the sound) comprising the first effect data (effect data related to the sound) corresponding to the identification information provided to a predetermined decoration member and including the sound effect information as the effect information related to the predetermined decoration member and the second effect data (effect data related to the sound) not including the sound effect information as the effect information related to the predetermined decoration member.

In addition, the sound control circuit 306 is provided with means for memorizing the sound effect information (for example, melody, tone color, effect sound, sing related to a figure) corresponding to the first effect data and the sound effect information corresponding to the second effect data.

When the detachable decoration member is mounted to the base, the first effect data (effect data related to the sound) is selected in a high probability, as compared to the second effect data (effect data related to the sound), so that the sound relating to the sound effect information corresponding to the first effect data is outputted from the speaker.

In addition, in the same manner as the effect by display and the effect by sound, with regard to the effect by light (light-emitting), it may be memorized the first effect data (effect data related to the light), the second effect data (effect data related to the light), the light effect information corresponding to the first effect data (for example, light-emitting color, light-emitting interval) and the light effect information corresponding to the second effect data.

In the mean time, in the embodiment, the FIG. 40 may be prepared according to following (1) and (2).

(1) The FIG. 40 is received in a capsule having a diameter of about 7 cm and is purchased from a vending machine equivalent to a card vending machine for buying a pre-paid card so as to borrow a gaming ball.

(2) The FIG. 40 may be prepared through a present exchange when the number of gaming balls, which are obtained by playing a game with the pachinko gaming machine 1, reaches a predetermined number. The prepared FIG. 40 is used to play a next game with the pachinko gaming machine 1.

As described above, according to the embodiment, when the detachable decoration member (FIG. 40) is mounted to the mounting means (base 50) of the gaming machine main body, an effect is carried out, based on the effect data corresponding to the identification information (figure ID) provided to the decoration member. Accordingly, it is possible to match the decoration member and the contents of effect (image display). In addition, when a game is over, the player can separate and possess the detachable decoration member (FIG. 40) from the mounting means to which the member is mounted. Accordingly, it is possible to enable the player to feel a strong affection for the decoration member.

In addition, according to the embodiment, when the big win gaming state (big win) is determined, the effect (image display), which corresponds to the identification information (figure ID) provided to the decoration member (FIG. 40) mounted to the mounting means (base 50) and is also related to the first effect data including the effect information relating to the decoration member, is preferentially carried out. Accordingly, it is possible to interrelate the decoration member and the effect in the big win gaming state and to enable the player to feel a strong affection for the decoration member. In addition, since the effect (image display) relating to the first effect data including the effect information related to the decoration member (FIG. 40) is preferentially carried out, it is possible to interrelate the decoration member and the player's expectations that a big win will be made, thereby enabling the player to feel a strong affection for the decoration member.

In addition, according to the embodiment, when it is determined that the gaming state is shifted to the special gaming state (for example, probability variation), the effect (image display), which corresponds to the identification information (figure ID) provided to the decoration member (FIG. 40) mounted to the mounting means (base 50) and is also related to the first effect data including the effect information relating to the decoration member, is preferentially carried out. Accordingly, it is possible to interrelate the decoration member and the effect in the special gaming state and to enable the player to feel a strong affection for the decoration member. In addition, since the effect (image display) relating to the first effect data including the effect information related to the decoration member (FIG. 40) is preferentially carried out, it is possible to interrelate the decoration member and the player's expectations that a special gaming state (for example, probability variation) will be made, thereby enabling the player to feel a strong affection for the decoration member.

In addition, according to the embodiment, when any one of the plural detachable decoration members (FIG. 40) having types different from each other is mounted to the mounting means (base 50), the effect (image display) relating to the effect data corresponding to the identification information (figure ID) provided to the corresponding decoration member is carried out. Accordingly, it is possible to match the various decoration members and the contents of effect and to enable the player to feel a strong affection for the decoration member.

In the above embodiment, it has been described the case where the invention is applied to the gaming machine whose pachinko gaming machine main body is attached to the game base. However, the invention is not limited thereto. For example, the invention can be applied to the various gaming machines, such as pachi-slot gaming machine (slot machine), mah-jong, smart ball or various gaming machine equipped in a game arcade.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A gaming machine comprising:

a gaming machine main body that plays a game with a predetermined game medium;

one or more decoration members, each having identification information memorized therein;

mounting means mounted to the gaming machine main body, the one or more decoration members being detachably mounted thereto;

special gaming state determining means for determining a special gaming state as a gaming state of when the big win gaming state, which is advantageous to a player, is over, the special gaming state having a high probability that it will be made a big win gaming state next time, effect data memorizing means for memorizing plural sets of effect data, each of which sets corresponds to the identification information of a predetermined decoration member in the one or more decoration members, and includes first effect data including effect information related to the predetermined decoration member and second effect data not including the effect information related to the predetermined decoration member;

identification information reading out means for reading out the identification information from a decoration member in the one or more decoration members, when the decoration member is mounted to the mounting means;

effect data selecting means for selecting, from the plural sets of effect data memorized in the effect data memorizing means, the first effect data corresponding to the identification information read out by the identification information reading out means in a high probability, as compared to the second effect data, when it is determined that the gaming state is shifted to the special gaming state by the special gaming state determining means; and effect means for carrying out an effect, based on the effect data selected by the effect data selecting means.

2. The gaming machine according to claim 1, wherein the effect data memorizing means memorizes the plural sets of effect data, each corresponding to the identification information which correspond to a decoration members in the one or more decoration members having types different from each other.

3. The gaming machine according to claim 1, further comprising a display device which displays thereon a game-related-effect image, wherein the effect means carries out an effect by displaying the game-related effect image on the display device, based on the effect data selected by the effect data selecting means.

4. The gaming machine according to claim 1, further comprising a speaker which outputs a game-related sound, wherein the effect means carries out an effect by outputting the game-related sound from the speaker, based on the effect data selected by the effect data selecting means.

5. The gaming machine according to claim 1, further comprising a lamp which performs a game-related light emission, wherein the effect means carries out an effect by causing the lamp to per-form a game-related light emission, based on the effect data selected by the effect data selecting means.

6. A gaming machine comprising:

a gaming machine main body that plays a game with a predetermined game medium;

one or more decoration members, each having identification information memorized therein;

mounting means mounted to the gaming machine main body, the one or more decoration members being detachably mounted thereto;

big win gaming state determining means for determining to shift a gaming state to a big win gaming state which is advantageous to a player, when a winning of a gaming ball is made in a winning hole provided to the gaming machine main body;

effect data memorizing means for memorizing plural sets of effect data, each of which sets corresponds to the identification information of a predetermined decoration member in the one or more decoration members, and includes first effect data including the effect information related to the predetermined decoration member and second effect data not including the effect information related to the predetermined decoration member;

identification information reading out means for reading out the identification information from a decoration member in the one or more decoration members, when the decoration member is mounted to the mounting means;

effect data selecting means for selecting, from the plural sets of effect data memorized in the effect data memorizing means, the first effect data corresponding to the identification information read out by the identification information reading out means in a high probability, when it is determined that the gaming state is shifted to the big win gaming state by the big win gaming state determining means; and effect means for carrying out an effect, based on the effect data selected by the effect data selecting means.

7. The gaming machine according to claim 6, wherein the effect data memorizing means memorizes the plural sets of effect data, each corresponding to the identification information which correspond to a decoration member in the one or more decoration members having types different from each other.

* * * * *